(12) United States Patent  (10) Patent No.: US 7,466,703 B1
Arunachalam et al.  (45) Date of Patent: Dec. 16, 2008

(54) SCALABLE HIGH SPEED ROUTER APPARATUS

(75) Inventors: Raman Arunachalam, Freehold, NJ (US); Vijay P Kumar, Freehold, NJ (US); Sunder R Rathnavelu, Marlboro, NJ (US); Dimitrios Stiliadis, Middletown, NJ (US); Hong-Yi Tzeng, Tinton Falls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 09/303,718

(22) Filed: Apr. 30, 1999

Related U.S. Application Data

(60) Provisional application No. 60/083,792, filed on May 1, 1998.

(51) Int. Cl.
*H04L 12/28* (2006.01)
(52) U.S. Cl. ............... 370/392; 370/351; 370/389; 370/400; 370/412
(58) Field of Classification Search ........ 370/389, 370/392, 399, 409, 359, 229, 231, 419, 428, 370/412, 413, 400, 351, 395.3
See application file for complete search history.

(56) References Cited

U.S. PATENT DOCUMENTS 6,104,700 A * 8/2000 Haddock et al. ............ 370/235
6,147,991 A * 11/2000 Rogers ...................... 370/389
6,160,811 A * 12/2000 Partridge et al. ........... 370/401
6,317,416 B1 * 11/2001 Giroux et al. .............. 370/232
2002/0023168 A1 * 2/2002 Bass et al. .................. 709/232
2002/0039351 A1 * 4/2002 Wang et al. ................ 370/235

* cited by examiner

*Primary Examiner*—Hanh Nguyen

(57) ABSTRACT

A scalable, high-speed router for routing packets of information through an interconnected network comprises an interface for receiving a packet containing header and data information; a device for extracting routing information from the header of an arrived packet and generating a corresponding header packet for the arrived packet; a memory device for storing the data information of the arrived packet at predetermined memory locations; a device for processing the corresponding header packet to determine a route for the arrived packet and assigning packet forwarding information to the header packet; and, a device for retrieving the data information from the predetermined memory locations and forwarding both the data and header packet containing the packet forwarding information to the interface for routing the packet to a further destination in accordance with the packet forwarding information. The processing device includes devices performing filtering, route-table lookup and flow identification functions and which devices are organized in a pipelined fashion for successive, high-speed operations on the header packet. The router ensures that the arrived packet is forwarded in accordance with any quality of service requirements and flow specifications.

16 Claims, 14 Drawing Sheets

FIG. 6A

| ADDRESS | HighByte | LowByte |
|---|---|---|
| 1 | DestinationAddress (31:24) | DestinationAddress (24:16) |
| 2 | DestinationAddress (15:8) | DestinationAddress (7:0) |
| 3 | SourceAddress (31:24) | SourceAddress (23:16) |
| 4 | SourceAddress (15:8) | SourceAddress (7:0) |
| 5 | Destination Port (15:8) | Destination Port (17:0) |
| 6 | Source Port (15:8) | Source Port (17:0) |
| 7 | Protocol (7:0) | TimeToLive (7:0) |
| 8 | PHY Index (7:0) | PollerIndex (7:0) |
| 9 | TypeOfService (7:0) | FrameType (7:0) |
| 10 | PacketLength (15:8) | PacketLength (7:0) |
| 11 | TunnelSource (31:24) | TunnelSource (23:16) |
| 12 | TunnelSource (15:8) | TunnelSource (7:0) |
| 13 | PageListHead (31:24) | PageListHead (23:16) |
| 14 | PageListHead (15:8) | PageListHead (7:0) |
| 15 | ControlFlags (31:24) | ControlFlags (23:16) |
| 16 | ControlFlags (15:8) | ControlFlags (7:0) |
| 17 | RecordRoute Option Offset (7:0) | Strict Source Option Offset / ICMP Type (7:0) |
| 18 | LooseSource Option Offset / ICMP Code (7:0) | QoS Parameters (23:16) |
| 19 | QoS Parameters (15:8) | QoS Parameters (7:0) |
| 20 | FlowQueueIndex (15:8) | FlowQueueIndex (7:0) |
| 21 | QoSClass (15:8) | QoSClass (7:0) |
| 22 | MACAddress (47:40) | MACAddress (39:32) |
| 23 | MACAddress (31:24) / MulticastBitmap (31:24) | MACAddress (23:16) / MulticastBitmap (23:16) |
| 24 | MACAddress (15:8) / MulticastBitmap (15:8) | MACAddress (7:0) / MulticastBitmap (7:0) |

FIG. 6B

| FLAG | BIT POSITION |
|---|---|
| IcmpError | 1 |
| LarrIpOption | 2 |
| SarrIpOption | 3 |
| RrIpOptiion | 4 |
| TimestampOption | 5 |
| DontFragment | 6 |
| EndSourceRoute | 7 |
| TunnelInPacket | 8 |
| RedirectPacket | 18 |
| MacInArpCache | 19 |
| ClassifyQueue | 20 |
| BandWidthSpecified | 21 |
| QueueSpecified | 22 |
| UpdateArpEntry | 23 |
| NeedArpPacket | 24 |
| PacketFromRc | 25 |
| IpInIpPacket | 26 |
| TunneledPacket | 27 |
| BroadcastPacket | 28 |
| MulticastPacket | 29 |
| RcPacket | 30 |
| DropPacket | 31 |
| PassPacket | 32 |

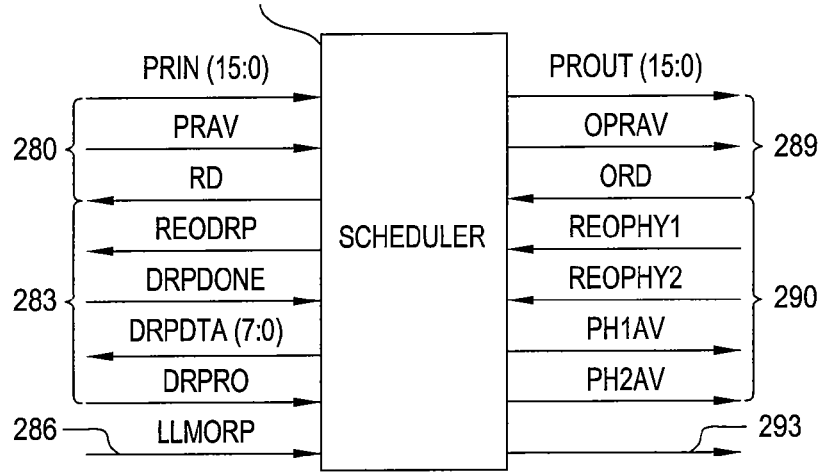

Check if packet is multicast
Store packet in packet record descriptor defined by PageList
For each PHY that packet must be multicasted do
    Add packet to queue Q[ I ];
    Increase the size of queue I;
    if (Packet DOES NOT HAVE OPTIONS) then
      Increase the size of the queue associated with give PHY
      Buffer management module should update statistics
      if size of Q[ I ] >= 1 then
        if packet is the first for SuperClass SC then
            insert packet in main scheduler for SuperClass SC
        else if packet is the first for Class C of SuperClass SC then
            insert packet in class scheduler for SC for class C
        else
            insert packet to calendar queue corresponding to Class C and SuperClass SC
    end if;
else
    Insert Complete packet record in a linked list of packets with Options
    end if;
end for;

FIG. 9B

Update global scheduler system potential;
    Search the global scheduler table for the superclass with the minimum FP;
    Dispatch packet for transmission;
    Update queue size of corresponding PHY;
    If packet is multicast to multiple Virtual Interfaces then
      Dispatch packet for transmission multiple times, once for
      each Virtual Interface
    end if;
    Search the SuperClass table for the next packet eligible packet;
    if (no more packets in superclass) then
        exit;
    end if;
    Calculate new Starting and Finish potential of superclass;
    Add entry to global scheduler;
    Find the next packet for transmission within class
    if (no more packets within class) then
        exit;
    end if;
    Calculate new Starting and Finish potential of class;
    Add entry to SuperClass Scheduler;
    Select next packet for transmission from the class calendar queue;
    add entry in the class scheduler;

FIG. 10

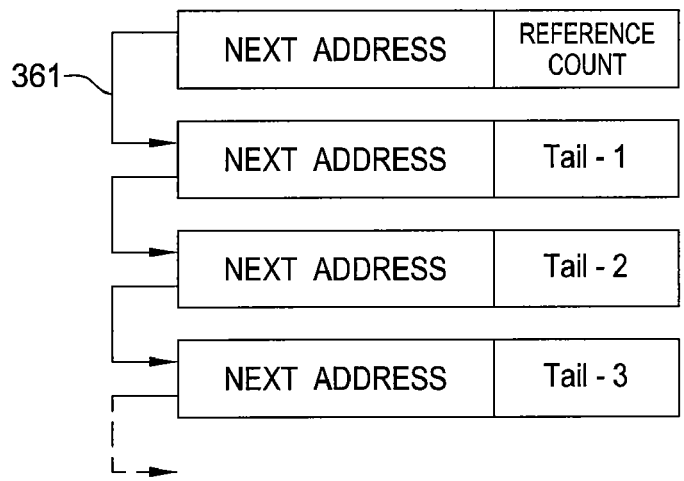

FIG. 11

If multicast packet then
    get multicast bitmap
    determine interface processors for forwarding packet
    forward packet record to all these interface processor
    use pointer to head of packet to access reference count and
    update it with the number of interfaces that packet must be
forwarded.
Else
    use PollerIndex to determine outgoing interface processor
    Forward packet to interface processor
end if
Run buffer sizing algorithm

FIG. 14

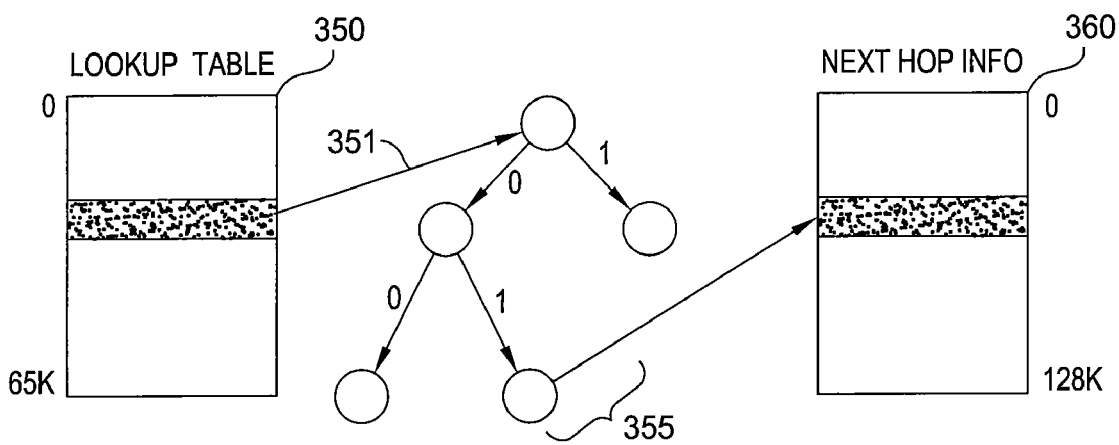

FIG. 12A

INTP = INTERFACE PROCESSOR
On packet record arrival from the Flow ID.

If unicast packet then
       Forward packet to INTP [ PollerIndex ]
       BufferCounter [ PollerIndex ] + = PacketRecord [ Size ]
       UnicastBuffers + = PacketRecord [ Size ]
else if multicast packet then
       McastBufferCounter + = PacketRecord [ Size ]
       If McastBufferCounter > McastThreshold then
              McastBufferCounter - = PacketSize
              drop packet record
       else
              Forward packet based on multicast bitmap to multiple pollers
       end if
end if
Run Buffer Control Algorithm

FIG. 12B

INTP = INTERFACE PROCESSOR
On packet deletion

If unicast packet then
       BufferCounter [ INTP ] - = PacketSize
       UnicastBuffers - = PacketSize
       OutStandingBuffers [ INTP ] - = PacketSize
       TotalOutstanding - = PacketSize
else if multicast packet then
       McastBufferCounter - = PacketSize
end if

FIG. 13

Buffer Size Control

TotalBuffers = McastBufferCounter + UnicastBuffers
    Overflow = MAXBUFFERS - TotalBuffers + TotOutstanding
    if Overflow then
        select poller such that
        BufferCounter [ Poller ] - Outstanding [ Poller ] > MAXBUF [ Poller ]
        Send delete signals to that poller for a total of
        min ( Overflow, MAXBUF [ Poller ] ) packets;
        Outstanding [ Poller ] + = min ( Overflow, MAXBUF [ Poller ] );
        TotalOutstanding + = min ( Overflow, MAXBUF [ Poller ] );
    end if

FIG. 15A 1. if ( PacketRecord [ Control ] & ( IcmpError | DropPacket | RcPacket ) then
2.     go to FORWARD
3. end if;
4. using 16 most significant bits for hashing
5. Search corresponding tree
6. Match corresponding router entry
7. if ( RouterEntry [ Flags ] & RcAddress ) then
8.     PacketRecord [ control ] | = RcPacket;
9. end if;
10. if ( PacketRecord - > Protocol = IPPROTO_IGMP ) | ( PacketRecord - > DestinationAddress> = 0x0000000 ) &&
11.     ( PacketRecord [ DestinationAddress ] < = 0xe00000ff ) ) then
12.     PacketRecord [ Control ] | = RcPacket;
13.     go to FORWARD
14. end if;
15. if ( No TreeNode or No Route Entry ) then
16.     if ( PacketRecord [ Control ] && SarrIpOption )
17.         PacketRecord [ ICMP_CODE ] = ICMP_UNREACHABLE_SOURCE_FAIL
18.     else
19.         PacketRecord [ ICMP_CODE ] = ICMP_UNREACHABLE_NET :
20.     else if;
21.     PacketRecord [ ICMP_TYPE ] = ICMP_UNREACHABLE
22.     PacketRecord [ CONTROL ]  = ICMP_ERROR
23.     go to FORWARD
24. end if;
25. if ( PacketRecord [ Control ] & UpdateArpEntry ) then
26.     If ( RouteEntry exists ) then
27.         PacketRecord [ MacAddress ] = RouterEntry
28.     else
29.         PacketRecord [ Control ] | = MacInArpCache
30.     end if;
31.     go to FORWARD
32. end if;
33. if (( PacketRecord [ Control ] & SsrrIpOption ) && ( RouteEntry [ Flags ] &Point2Point ))
34.     PacketRecord [ IcmpType ] = ICMP_UNREACHABLE
35.     PacketRecord [ IcmpCode ] = ICMP_UNREACHABLE_SOURCE_FAIL
36.     PacketRecord [ Control ] | = ICMP_ERROR | DROP_PACKET;
37.     go to FORWARD
38. end if;
39. if ( ( RouteEntry [ PollerIndex ] = PacketRecord [ PollerIndex ] ) &&
40.     ( RouteEntry [ PhyIndex ] = PacketRecord [ PhyIndex ] &&
41.     ( PacketRecord [ DestinationAddress ] > 0 )            &&
42.     ( PacketRecord [ SourceAddress ] & TreeNode [ SubnetMask ] = RouteEntry [ NextHop ] )) then
43.     PacketRecord [ RouteEntry ] = RouteEntry;
44.     PacketRecord [ ICMPTYPE ] = ICMP_REDIRECT;
45.     PacketRecord [ Control ]  = ICMP_ERROR |DROP_PACKET;
46.     go to FORWARD
47. end if;

FIG. 15B

49. PacketRecord [ PHYIndex ] = RouteEntry [PHYIndex ];
50. PacketRecord [ PollerIndex ] = RouteEntry [ PollerIndex ];
51. if ( RouteEntry [ flags ] &Gateway ) then
52.     PacketRecord [ Control ] | = MacInArpCache;
53.     go to FORWARD
54. end if;
55. if ( NOT ( RouteEntry [ Flags ] &ValidMacFlag )) then
56.     PacketRecord [ Control ] | - NeedArpPacket;
57.     PacketRecord [ MacAddress ] = RouteEntry
58.     go to FORWARD;
59. end if;
60. PacketRecord [ MacAddress ] = RouteEntry [ MacAddress ];
61. FORWARD;
62.     forward packet to Flow Identification

FIG. 16

1. If ( ClassifyFlag = 1 ) then
2.     Hash_Index = Hash ( Source Address, Destination Address, Source Port, Destination Port, Prot );
3.     FlowRecord = Hash_Table ( Hash_Index );
4.     if ( FlowRecord = NULL ) then
5.         FlowRecord = random (1.64K );
6.     end if;
7.     If ( fields in flow record match with fields in packet record ) then
8.         update QoS parameters of packet record
9.         update statistics in flow record
10.     else
11.         Clear statistics of flow record.
12.         Replace fields of flow record from fields in packet record
13.         Update QoS parameters of packet record.
14.     End if;
15. end if;
16. if ( MacInArpCache = 1 ) then
17.     MacIndex = DestinationAddress (15 downto 0 );
18.     MacTag = MacTable ( MacIndex );
19.     if ( MacTag = DestinationAddress ( 31 downto 16 ) ) then
20.         Update MAC address in packet record
21.     else
22.         Set NeedArp flag
23.     end if;
24. end if;
25. update packet record and transmit it

SCALABLE HIGH SPEED ROUTER APPARATUS

RELATED APPLICATIONS

This application claims the benefit of provisional U.S. Patent Application Ser. No. 60/083,792, filed May 1, 1998.

FIELD OF THE INVENTION

The present invention relates generally to packet routing devices, and particularly, to a scalable packet routing apparatus that provides high throughput and quality of service.

BACKGROUND OF THE INVENTION

Traditional routers have been CPU-based with all the processing being done by software. A conventional router receives an IP packet on an incoming link, performs a route table lookup to decide the next hop based on the destination address carried in the header, and forwards the packet on the appropriate outgoing link to the next node on the path. This process is essentially hop-by-hop Layer 3 store-and-forward routing, and is independent of the underlying data link layer (Layer 2).

In addition, routers that are required to support differentiated services must be able to process more than the destination address of the packet, including for example the source address, the protocol type, the protocol port numbers if available, the Type-of-Service bits etc. Such routers must be also capable of processing all packets as they arrive without requiring any storing of packets before processing for every type of packet arrivals, irrespective of the size of the packets or the information in the packet headers.

SUMMARY OF THE INVENTION

The instant invention is a high-speed packet router based on a scalable architecture for supporting a bandwidth range up to hundreds of Gigabits per second or hundreds of millions of packets per second. The router presented in the invention description is customized to support only IPv4 traffic at wire speeds by implementing a lot of the functionality in hardware. However, it must be understood that any other protocol can be supported using similar functions and anyone skilled in the arts is expected to be able to customize the architecture for other protocols. The minimal router configuration consists of a Smart Router Interface ("SRI") and a Router Controller ("RC"). The SRI implements all the packet forwarding functions, while the RC executes the various routing protocols. This router can be scaled up to larger capacity by using multiple Smart Router Interfaces together with multiple Router Controllers connected by a Switch Fabric.

In accordance with the principles of the invention, the router separates the data forwarding path, i.e. the storing and copying of data packets from the control operations, i.e. the algorithms that implement the forwarding decisions as to where the packet must be forwarded, Particularly, when a packet arrives, it is forwarded to a memory; at the same time a packet record is created containing only the control information necessary to process that packet. A variety of hardware processing elements perform operations like filtering, route table look-ups, queue identification, scheduling and buffer management on the packet record in a pipelined fashion. In the current architecture the pipelined/serial interconnection of processing elements was selected. However, this selection should NOT preclude any other interconnection of the processing elements that does not follow a serial fashion for example, an alternative architecture such as that shown in FIG. 21 which utilizes a bus interconnection mechanism between various modules is well within the scope of the present invention. The main novelty of the invention is that:
1. The data path of all packets is separated from the processing path.
2. A packet record is created that has all the important information of the packet.
3. The packet record is processed in parallel or pipelined by several processors. The processing functions are distributed among processors based on a functional basis. Thus parallelization and increased throughput is achieved though a functional partitioning, contrary to other approaches that achieve the same through a packet-by-packet partitioning.

The main advantages of such an architecture is as follows:
1. There is no connection-level assignment of processing units to connections. For the previously discussed multiprocessor architecture, such an assignment is needed for load balancing and this has several disadvantages that were pointed out. With this architecture, flow identification is only required for storing packets in the output link queues.
2. The importance of the operating system is diminished. Each processor is a single processing element that is dedicated to one function.
3. Since each processor handles only one functional component of the packet processing requirements it only requires a local copy of any data relative to this part of the process. Thus, each processor needs only a small part of the data related to forwarding of a packet, and as result these data can be stored in a smaller and thus cheaper and faster memory.
4. Updates of the data that are required for forwarding are easier, since each processor must keep updated a small subset of the forwarding data.
5. The architecture can scale arbitrarily by allowing farther partitioning of the forwarding processes to smaller functional blocks.
6. When higher throughput is desirable, Application Specific Integrated Circuits (ASICs) can replace processing elements easily. The one-function only nature of each processor enables efficient hardware implementation The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF DRAWINGS

FIG. 6(a) illustrates a typical packet record to be routed in and processed by the scalable router of the invention.

FIG. 6(b) illustrates control fields contained in a typical packet record to be routed in and processed by the scalable router of the invention.

FIG. 7 is an interface diagram showing inputs and outputs to the scheduler device of the SRI.

FIG. 9(a) illustrates an example algorithm executed by the scheduler for processing an arriving packet.

FIG. 9(b) illustrates an example algorithm executed by the scheduler for processing a departing packet.

FIG. 10 illustrates the Linked List data structure for tracking addresses of packet data stored as pages in Buffer Manager memory.

FIG. 11 illustrates an example algorithm executed by the LLM for distributing packet records arriving from the flow identification engine to the Interface Processor.

FIG. 12(a) illustrates an example algorithm executed by the LLM for tracking the buffer occupancy on packet arrival from the Flow ID.

FIG. 12(b) illustrates an example algorithm executed by the LLM for tracking the buffer occupancy on packet deletion.

FIG. 13 illustrates an example algorithm executed by the LLM for maintaining buffer size control.

FIG. 14 illustrates the operation of the router look-up operation in the Route Table Lookup engine of the SRI.

FIGS. 15(a) and 15(b) illustrate an example algorithm executed by the Route-table lookup engine for performing error checking and sanity operations.

FIG. 16 illustrates an example algorithm executed by the Flow-Identification engine for selecting a queue.

DETAILED DESCRIPTION OF THE INVENTION

Figure 1:
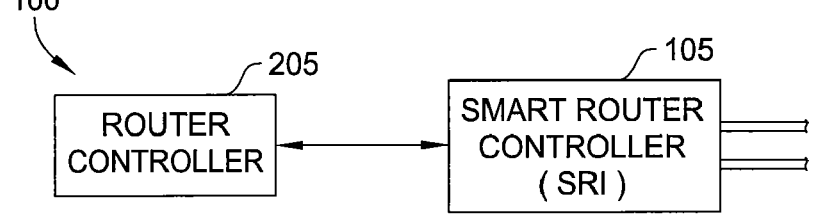
FIG. 1 illustrates a minimal embodiment of the router of the invention.
Figure 2:
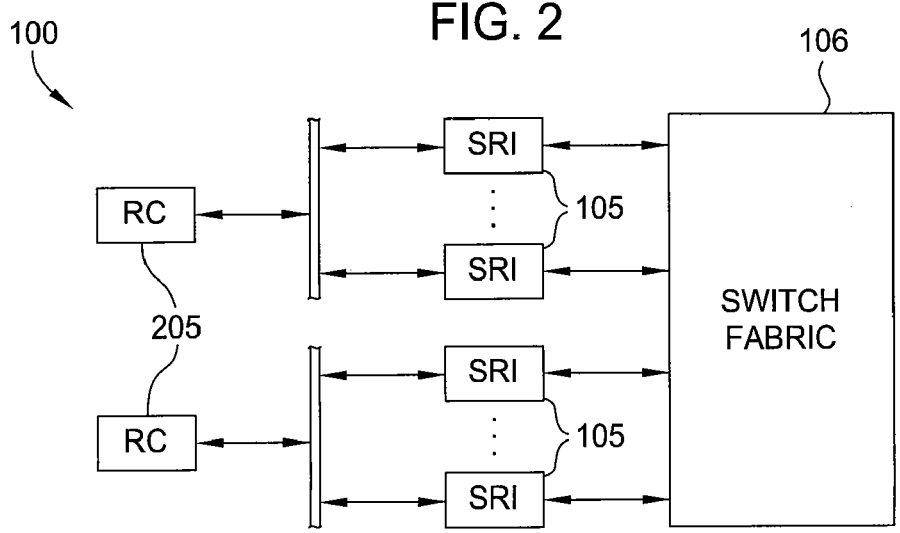
FIG. 2 illustrates a general diagram of the scalable router 100 of the invention.

The router of the invention implements the hardware and/or software modules required for receiving, processing and forwarding packet data in a high-speed manner. Essentially, the router 100 implements hardware modules to separate the data movement path from the forwarding decisions in a manner such that packet forwarding is implemented on a scalable way that allows the router to support forwarding of several millions packets per second. At a minimum, as shown in FIGS. 1 and 2, the router 100 of the instant invention includes a Smart Router Interface ("SRI") 105 that provides hardware acceleration for the critical functions such as table lookup and packet forwarding, and a Router Controller ("RC") 205 that runs software to compute routes and provided all management functions based on a number of routing or network management protocols. In the preferred embodiment, the router 100 can be scaled up to larger capacity by using multiple Smart Router Interfaces ("SRIs") 105 together with multiple Router Controllers 205 connected by a packet switching fabric 106.

Figure 3:
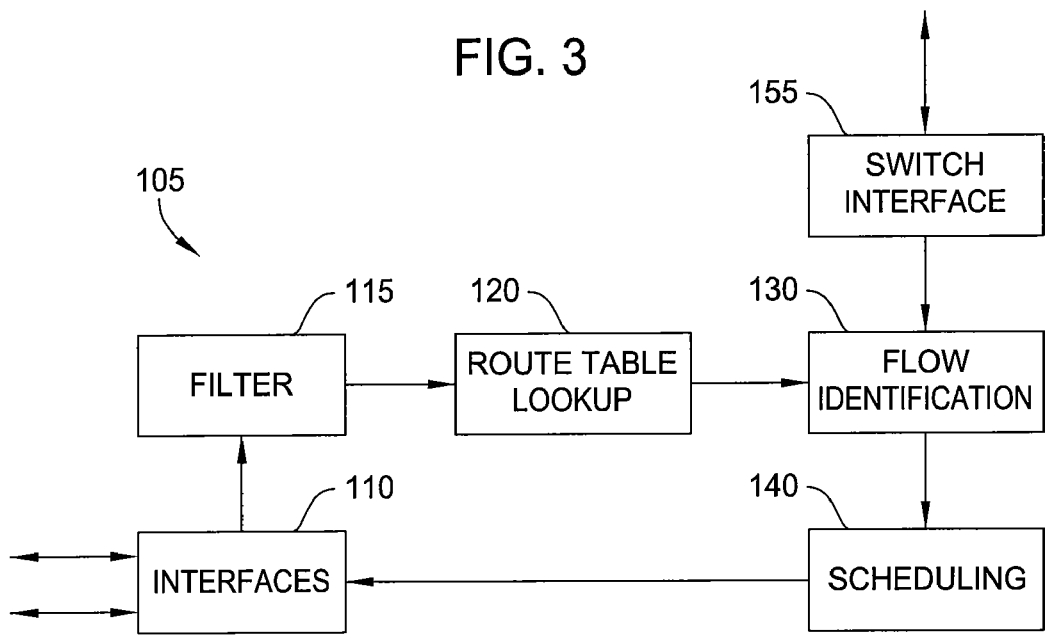
FIG. 3 is a flow diagram illustrating general operations performed on an arriving packet.

The essential operations performed by the SRI 105 on an incoming packet are shown in FIG. 3. Initially, new packets arrive at the router through a physical interface 110, e.g., an Ethernet cable or OC3/OC12 elements, or packets that have already been processed may arrive from another SRI through a switch fabric interface 155. Newly arrived packets are immediately stored in a packet memory which consists of a free list of pages the size of which is variable and user programmed. A paging mechanism is used to allow the manipulation of variable sized packets. Once a packet is stored in the memory, a corresponding packet record is created that consists of the header of the packet together with some additional information for facilitating processing and switching. The purpose of the packet record is to provide the means for passing information about the packet between the different components of the SRI 105 without having to use the entire packet.

In the instance of new packet arrivals, after being stored in packet memory, the packet record is first sent to a Filter 115, where a set of rules defines actions to be applied in the packet such as classifying it a Quality-of-Service class, dropping it if it is initiated from an unauthorized source, selecting a specific routing table for forwarding and determining the aggregation rules for the classification. Furthermore the filter engine may apply forwarding decisions that are based on several fields from the header of the packet and not just on the destination address. The filter engine is capable of processing the packet fast enough, so that by time that the next packet arrives in the router the filter engine will have completed its operation for the first packet. We will denote this feature as a capability for wire-speed processing. The packet record then goes to the Route Table Lookup 120 where the "next hop" address is determined based on the destination address, and in some cases (such as multicast packets) based on the source address as well. The packet record is then sent to a Flow Identification Engine 130 where the packet is classified as belonging to a specific flow or queue. The packet record is finally placed in a per-flow queuing system in the Scheduler 140, which decides when to transmit the packet out of the router along a link based on a fair queuing mechanism. The packet could also be sent to another SRI via the Switch Fabric Interface block 155. Most of the data packets are handled by this hardware accelerated path, while exceptions and options are processed by an on-board CPU. Packets arriving at the SRI through the Switch Fabric Interface block 155 are sent directly to the Flow Identification Engine 130, bypassing the Filter and Route Table Lookup Engine, as they have already been processed by those modules at the SRI.

Figure 4:
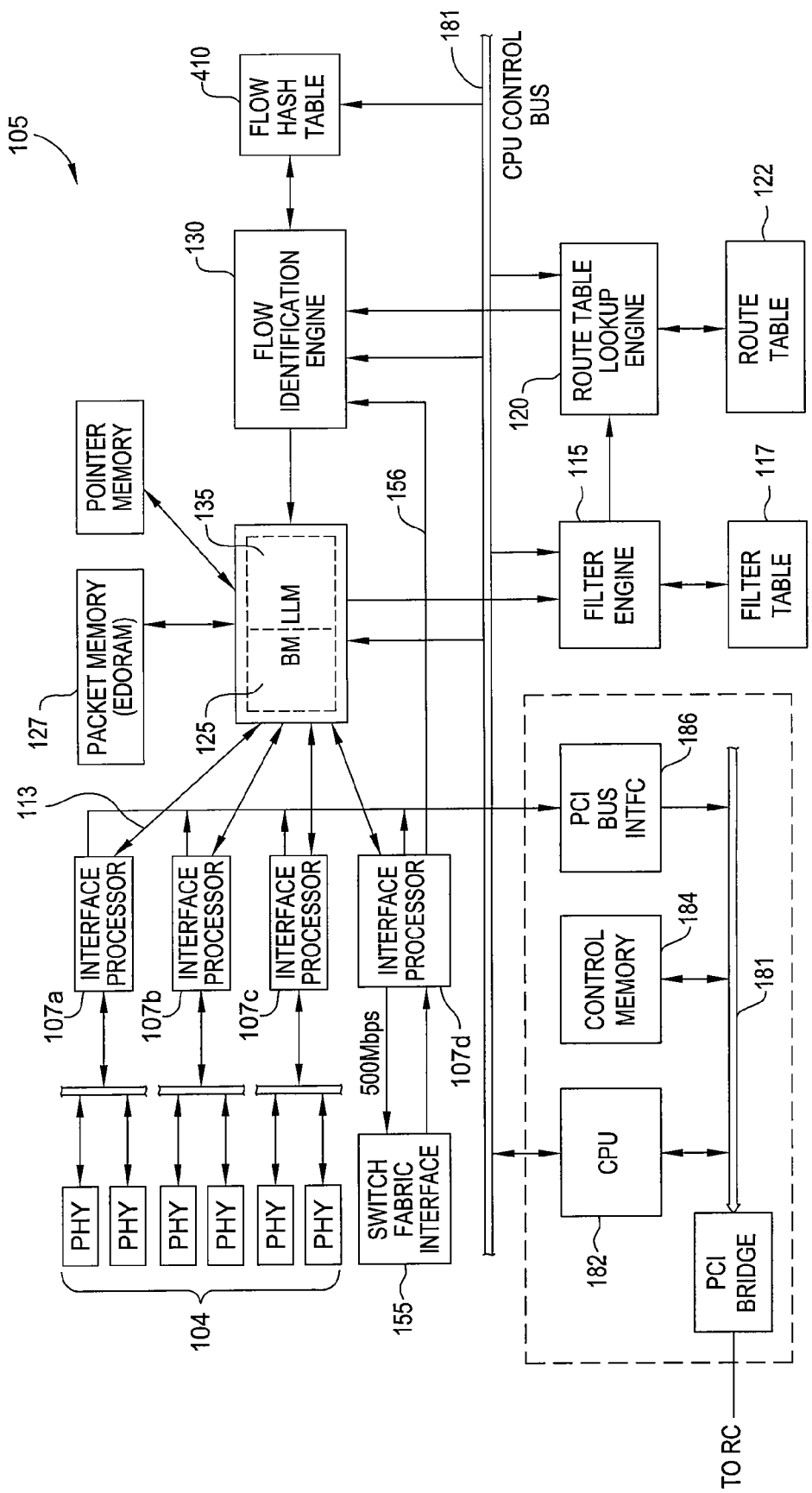
FIG. 4 is a diagram illustrating the detailed architecture of the scalable router interface 105 ("SRI") for the scalable router of the invention.

FIG. 4 is a detailed block diagram of the smart router interface 105 of the scalable router 100 of the invention. Briefly, the major elements of the SRI 105 of FIG. 4, include: Physical Interfaces ("PHYs") 104 that receive arriving packets from the physical connections; a Switch Fabric Interface 155 provides an interface to the switching fabric and receives pre-processed packets arriving from other SRIs; Interface Processors devices (ICD) 107a, . . . , d, that receive the packets from the PHYs and Switch Fabric Interface and perform all the necessary operations for presenting the data in the routing hardware in a manner such that high-speed processing is possible. In the design of the invention, an Interface Processor can support speeds up to 2.4 Gbps; a Buffer Manager ("BM") 125 which is a simple memory multiplexer that receives pages of data and addresses from the Interface Processors, stores the packet pages to the main packet memory 127, at a location denoted by the corresponding arriving address, receives requests from the Interface Processors 107a, . . . , d for specific pages and forwards the pages to the corresponding Interface Processors; a Link List Manager ("LLM") 135 is responsible for updating the link list structures and keeping track of the free packet memory. Additionally, the LLM 135 is a distributor for forwarding packet records arriving from a Flow Identification Engine Module 130 to the Interface Processors. The Flow Identification Engine Module ("FIM") 130 receives packets from the Router Table Lookup Engine 120 or directly from the switch fabric 106 (FIG. 2) and is responsible for assigning packets to specific flows or queues. A Router Table Lookup Engine ("RTL") 120 contains the full packet routing table 122 and it allows a full routing table lookup in an accelerated manner. A Filter Engine ("FLE") 115 performs packet filter functions for security, bandwidth management, traffic monitoring and statistics collection utilizing specifications posed by the network manager or RSVP. A filter table 117 is used as part of the filtering process. A Scheduler that decides the ordering of packets while transmitted in the interfaces and is responsible for guaranteeing the Quality-of-Service requirements. One scheduler is used together with each Interface Processor. A central processing unit ("CPU") 180 containing a processor device 182, and a control memory 184 provides hardware support for network management functions; and handles faults and exceptions. Additionally provided is the CPU Control bus 181 for communicating data and/or control information to/from each of the functional units of the SRI from/to the CPU 182. The same bus is used for receiving packet information from the Interface Processors and forwarding it to the CPU 182. Each of these functional blocks will be described in greater detail here in below.

In the architecture depicted in FIG. 4, each SRI 105 can support three Interface Processor devices 107a, 107b and 107c which terminate physical interfaces and one Interface Processor device 107d receiving processed packets from the Switch Fabric Interface 155. The architecture does not preclude a different number of Interface Processors to be used in each SRI. Interface processors may or may not reside in the same circuit pack as the rest of the SRI components. In the hardware architecture described, each Interface Processor 107a, ... 107c interfacing with PHYs can support a throughput of at least 2.4 Gbps, while the ones that interface with the Switch Fabric can support 4 Gbps. It should be understood that the illustrative embodiment of the SRI depicted in FIG. 4 is non-limiting, and other hardware configurations are possible without straying from the principles of the invention described herein.

Figure 5:
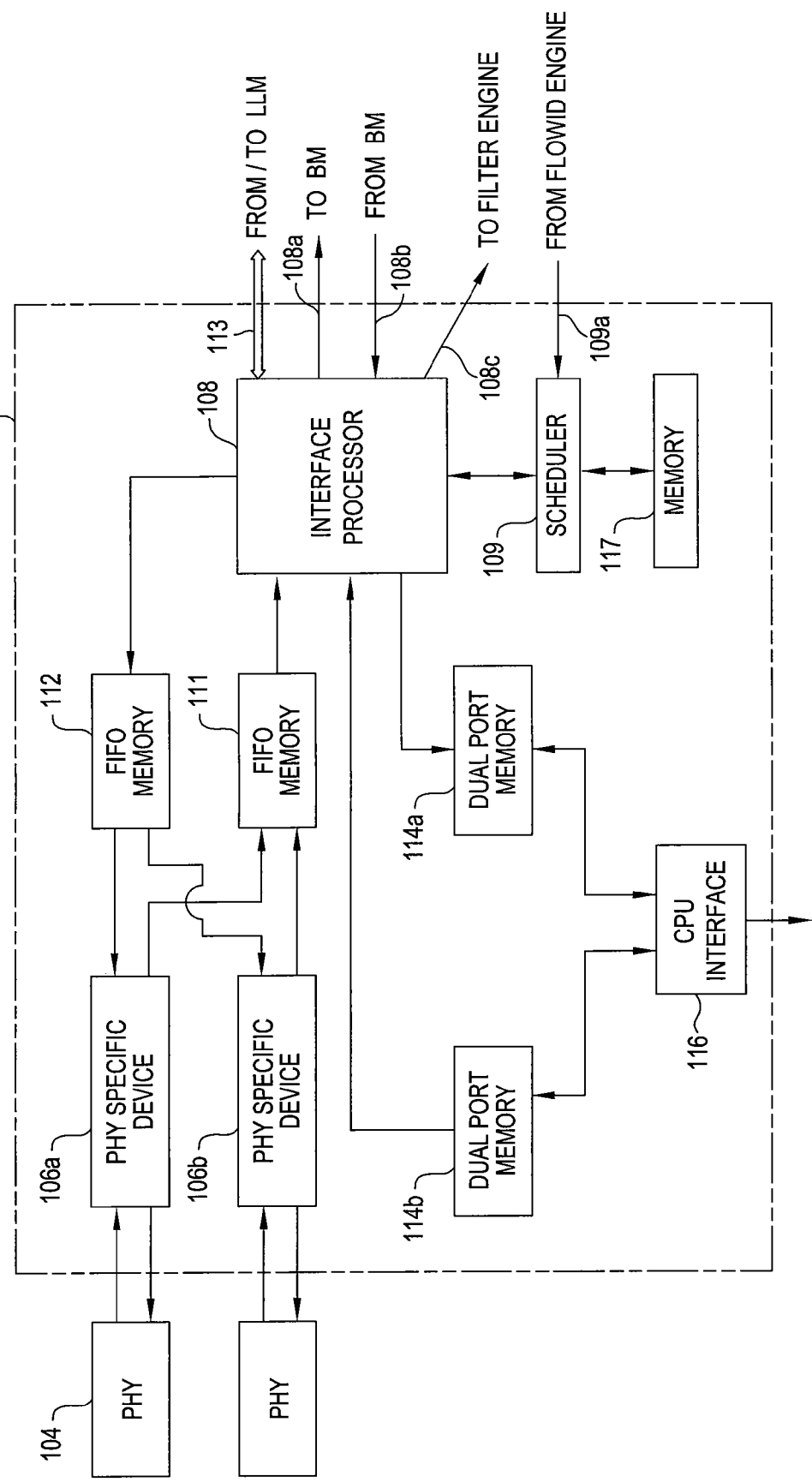
FIG. 5 is a diagram illustrating the detailed architecture of the Interface Processor module of in the SRI.

According to the principles of the invention, each Interface Processor 107 fetches byte stream packets from the PHYs and performs the essential preprocessing on them for the rest of the SRI. Specifically, as shown in FIG. 5, in the Interface Processor 107, an incoming packet is first transferred from the PHYs hardware specific devices 106a and 106b for pre-conditioning the product. The packets are then transferred to FIFO memory 111 and 112. The Interface Processor 108 reads the packets from the FIFO memory and forwards the packets to the free pages of the Buffer Manager as these are determined by the Link List Manager. While this transfer takes place, the header of the packet is captured and the preprocessing is initiated in Interface Processor 108. Specifically, Interface Processor 108 receives the page addresses and linked pointers of free memory locations from Link List Manager ("LLM") via LLM line bus 113 and the packet and page addresses are forwarded from the Interface Processor 108 to the Buffer Manager for storage in the main packet memory 127 via Interface Processor out bus 108a.

It should be understood that Interface Processor 108 can handle only the common packets. If packets arrive that require special processing, Interface Processor 108 captures as much information as possible and forwards this information to the on-board CPU 182 for further processing. Specifically, the Packet Processor 108 stores the actual packet in the Buffer Manager memory 125 as for normal packets and then it transmits a notification to the CPU 182 by writing a message to the Dual Port Memory 114a. The CPU 182 can read the message through the CPU interface 116, by reading the Dual Port Memory. For instance, if the arriving packet is an Address Resolution Protocol "ARP" packet, then the actual packet is still stored in the Buffer Manager memory 125 and a packet record is created for it that is sent to the CPU 182 by writing it to the Dual Port 114a. In addition, the CPU 182 has the ability to bypass the processing of packets in the SRI, by transmitting a packet directly to the PHY. In order to do that, the CPU 182 uses the CPU interface 116 to write the packet in the Dual Port Memory 114b. The Packet Processor will then read the packet and transmit it over the FIFO memory 112 to the PHY SPECIFIC devices 106a, 106b.

After packet records are processed by the SRI they arrive back to the SCHEDULER through connection 109a. The SCHEDULER schedules the packet records and decides when a packet must be transmitted. It then sends the packet record to the Packet Processor 108 that is responsible for retrieving the packet from the Buffer Manager memory 125 and sending over the FIFO memory 112 to the PHY SPECIFIC DEVICES 106a or 106b.

For the Packet Processor that interfaces with the Switch Fabric and CPU, it directly sends packets to the Flow Identification Engine 130 via Switch interface bus 156, bypassing the Filter Engine and the Route Table Lookup Engine 120, since these functions have already been performed at the ingress SRI.

FIG. 6(a) conceptually illustrates the packet record 201 that is created at the Interface Processor for the arrived packet. Essentially, the record 201 that is created contains the following information necessary to process the packet in the router 100: Source Address 203, Destination Address 206, Source Port 209, Destination Port 211; Protocol 213, e.g., TCP, UDP, ICMP, IGMP, etc.; Time To Live 216, PHY Index 219, representing the incoming PHY; Poller Index 221, representing the incoming Interface Processor; Type Of Service 223; Frame Type 226, e.g., IPv4, IPv6, IPX; Packet Length 229; Tunnel Source 231, i.e., the incoming interface for a normal multicast packet; Page List Head 233, indicating the pointer to the first page associated with this packet; Control Flags 236, Record Route Option Offset 239, Strict Source Option Offset/ICMP Type 241, Loose Source Option Offset/ICMP Code 243, MAC Address/Multicast Bitmap 246, Flow Queue Index 249, QoS Parameters 251, QoS Class 253. It should be understood that the packet record need not contain all of the routing and control information as indicated in FIGS. 6(a) and 6(b), or alternatively, may contain more information if additional processing is provided or is necessary. The above description is only provided for illustrative purposes.

The control flags 236 may include any combination of flags such as shown in FIG. 6(b) and can include: ICMP Error flag, Record Route, Strict Source, Loose Source, EndSourceRoute, Tunnel, Broadcast, DontFragment, ClassifyQueue, QueueSpecified, ClassSpecified, Drop Packet, etc. As known in the art, if there is source routing, the next hop destination is found from the source route. If there is Strict Source routing, as indicated by Strict SourceIP Option control flag 238, the current interface must match the address pointed to by the offset, otherwise the packet is dropped. If there is Loose Source routing, as indicated by Loose SourceIP Option control flag 237, then if any of the router interfaces matches the address pointed by the offset, the next hop address becomes the next address in the source route. Otherwise the next hop address remains the same. In summary the control flags represent the information that requires only one bit, or information that involves controlling and exchanging information between different processing elements.

Although not shown, the Interface Processor, and each of the other elements in the router, maintains a plurality of counters for statistical purposes, e.g., tracking router performance, or packets arrived, forwarded or dropped in accordance with the standard protocol. Particularly, the Packet Processor 108 maintains counters to keep track of the number of packets with: 1) a Bad Checksum; 2) invalid data length; 3) invalid header length; 4) inconsistent IP header and IP data lengths; 5) errors in IP options processing; 6) bad IP version number; 7) an unknown or unsupported protocol; 8) malformed tunnel options; 9) no room for tunnel options 10) packets that are too small to contain IP packet; 11) Packets that are forwarded; 12) packets that are discarded due to DontFragment Bit; 13) data successfully fragmented; 14) Fragments created for output; and 15) packets dropped by reason of shortage of resources. It should be understood that in view of the pipelined manner in which packet records are processed in the router, a separate module may be implemented for keeping counters for maintaining statistics of the processed packets without loss of performance. Additional counters can also be kept based on the requirements.

Referring back to FIG. 5, the scheduler 109 receives processed packet records and schedules the packets for departure. Specifically, upon arrival of a packet record from the FIE 130, Interface Processor 108 will successively request the LLM to provide the pointers to the packet pages over bus 113 and it will subsequently send these packet pointers to the BM 125 in order to receive the actual packet data that are transferred to the Interface Processor over bus 108b for immediate storage in FIFO memory queue 112. Based on the availability of local queues in memory 112, the Interface Processor may select a packet for deletion. On a delete command, the Interface Processor will read from the LLM 125 the size of the packets that must be dropped.

The algorithm that decides when packets should be dropped from the SRI 105 is implemented in the LLM. Specifically, the packet memory must always have available space for storing one packet from each of the physical interfaces. Denoting $MTU_i$ as the Maximum Transmission Unit of interface i, the packet memory must always have a free space equal to $O\ MTU_i+PipelineStages*64$ bytes, where i=1, ..., N. The moment the free space becomes less than or equal to the summation value, the scheduler will drop the packet until the free space becomes less than or equal to that value. Because there are different packet sizes, multiple packets may be dropped. As described in co-pending patent application A. Choudhury, T. V Lakshman. B. Suter, D. Stiliadis "A Method for Supporting Per-Connection Queueing for Feedback Controlled Traffic", U.S. patent application Ser. No. 08/961,122 filed Oct. 30, 1997, the contents and disclosure of which is incorporated by reference as if fully set forth herein, the scheduler 109 will implement a drop from front strategy.

If additional control or other processing is required, e.g., exceptional packets with options, the arrived packet record can be stored in local memory 114a for additional processing by CPU 182 (FIG. 4). Likewise, in accordance with a particular protocol, if the CPU is required to process and transmit the packet, it may be first stored in local memory 114b and then forwarded to the PHY interface through Interface Processor 108.

Scheduler

For each Physical Interface, the Scheduler 109 selects a packet to transmit, updates the necessary data structures, and queues the packet record in the appropriate queue indicated as memory 112 in FIG. 5. Specifically, after processing, the packet record is forwarded to the Interface Processor 107 from the flow ID engine 130 via the LLM over bus 109a, where it is stored in the memory 117 before it is scheduled for departure. For scheduling, the following fields may be required in the packet record for the Interface Processor: PHY Index 219, Poller Index 221, Packet Length 229, Flow Queue Index 249, QoS Parameters 251, and QoS Class 253.

The scheduler must first determine whether the arriving packet is a multicast packet or not, to which physical interface it is going and whether it is an options packet. A special queue in memory 114a will be dedicated to packets that have options since the main bottleneck for this queue is CPU processing.

FIG. 7 illustrates conceptually the Scheduler interface of a preferred embodiment. Lines 280 are the lines controlling the input of a packet record. Lines 283 are the control signals interfacing with the Interface Processor 108 requesting that a packet be dropped. Line 286 is received from the LLM to indicate that a packet is to be dropped. Lines 289 are for sending packet records out to the Packet Processor 108, lines 290 are lines indicating that a packet is available for scheduling, and line 293 is the interface to the memory 117.

When a packet arrives in the LLM 135, the LLM will set the PRAV signal and once the scheduler is ready, it will start sending the packet record to the scheduler. Each time a RD signal is asserted, the next word of the packet record must be presented. This is a standard format of a parallel interface. Other interface formats or combination of signals are also possible and can be determined by one skilled in the art. The scheduler can handle several physical interfaces at the same time (in our case 4). When a packet is available for a physical interface, the corresponding PH1AV signal is asserted. If no packets are in the queue for this PHY, the PHxAV signal is de-asserted. As the Packet Processor 108 can request the packet record, the scheduler will assert the OPRAV signal and the Interface Processor will read the packet record and transmit the corresponding packet.

The scheduler can also decide to drop a packet in which case it requests a DROP from the Packet Processor 108. When the Packet Processor is ready, it reads the corresponding information through the 8-bit DRPDATA bus and issues a delete command to the LLM 135. Specifically, the scheduler must at least transmit the pointer to the Buffer Manager where the packet is stored (i.e. the Pagelist field), and the length of the packet (i.e. Packet length (See FIG. 6(a)). The Packet Processor will relay this information to the LLM through the dedicated bus. When the transmission to the LLM is done, the Interface Processor asserts the DROPDONE signal to the scheduler. The LLMDRP signal 286 is supplied from the LLM 135 device and directs the scheduler to continue dropping packets as long as this signal is asserted. The Packet Processor 108 must request a new packet record from the scheduler in order to transmit a packet. In general, the operations of transmitting a packet in the physical interface and requesting the scheduler for the next packet record are done in parallel. In this manner, the scheduler will have enough time to search through the data structures and find the proper packet record to transmit.

The scheduler device 109 supports an efficient mechanism for allocating bandwidth to different Virtual Private Networks, performing per-flow queueing, and offering a different type of service to connections depending on the higher layer protocols. The scheme provides the network manager with additional capabilities to provide a range of different services depending on the use of the router.

Figure 8:
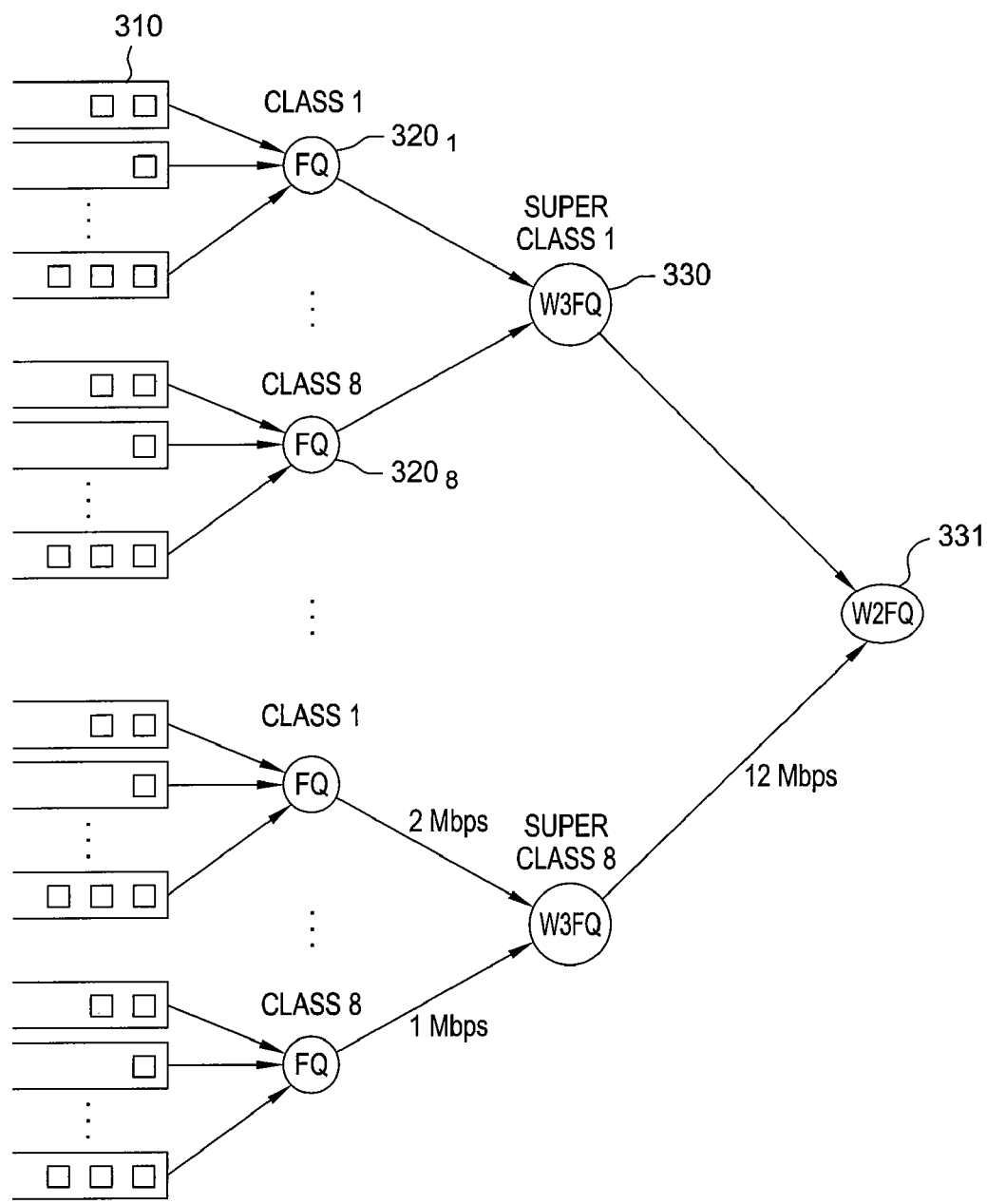
FIG. 8 illustrates the hierarchical scheduling operation in the scheduler device of the SRI.

As shown in FIG. 8, a class based hierarchical scheduling scheme is implemented that supports up to three layers of hierarchy: 1) the lowest layer 310 scheduling is performed on a per-flow basis; 2) a grouping of flows together to form a "class", e.g., classes $320_1$-$320_8$, based on a specification that is determined in the filter engine which grouping can be done based on any information in the header of the packet as this is defined by network management software; and, 3) a Worst-Case Fair Fair Queueing algorithm used to schedule packets that belong to different classes to form a "Super Class" 330. The binding of the first layer classes with a specific Super Class is determined by the network manager. Different portions of the output link bandwidth may be allocated to classes within a Super Class, or to a Super Class by itself. Finally Super Classes are scheduled through another layer of Weighted Fair Queueing schedulers.

The scheduler architecture can be scalable to a large number of classes or super classes. In the current implementation, a maximum of eight (8) super classes and a maximum of eight (8) classes per super class is supported. There is no restriction as for the number of flows per class. The only restriction arises from memory limitations and the FIE module where up to 64K flows can be identified.

On the first level of the scheduler, it is only required to implement a simple fair queueing scheme. On the class level or super class level, however, the worst-case fairness features are supported in order to preserve delay bounds for real time traffic. One more observation is that a simple Fair Queueing Algorithm can actually replace a Worst-Case Fair Fair Queueing Algorithm if the number of connections that the given scheduler supports is very small. Details of the Worst-Case Fair Fair Queueing Algorithm can be found in D. Stiliadis and A. Varma, A General Methodology for Designing Efficient Traffic Scheduling and Shaping Algorithms, in Proceedings of IEEE INFOCOM '97, the contents and disclosure of which is incorporated by reference herein.

Particularly, when a flow is classified in the filter engine 115, a class and a super-class is associated with this flow. The bandwidth that should be reserved for this flow must also be specified. The bandwidth allocated to a class or a super class should be also determined. It should be understood that a super class can simply denote a virtual interface in order to support tunneling of multicast packets. That is, Virtual Interfaces are treated as super classes and bandwidth will be allocated to them through same mechanism.

The implementation of the Worst-Case Fair Queuing Scheduler is done as follows. At the time that a packet reaches the front of the queue of the W2FQ server 331 (FIG. 8), a Finish Potential (FP) value is associated with a packet. As shown in FIG. 8, a small number of queues, e.g., eight (8), are scheduled by these servers with FP values stored in a high speed cache. The data associated with the class and super class schedulers must be stored inside the scheduler 109. Data associated with the flow schedulers are stored in the external SRAM. At the same time, the scheduler keeps track of the System Potential value. As will be described, an algorithm is implemented for calculating the system potential. The packet that is selected for transmission is the one that has the minimum Finish Potential and its Starting Potential is no larger than the system potential.

The implementation of the simple Fair Queuing Scheduler uses a set of calendar queues and corresponding k-ary trees that will be used to find the first packet that is eligible for transmission. The size of the calendar queues is restricted by the size of the memory that is available to the scheduler device. The k-ary tree that simulates a tree of priority encoders can provide the first (1) in less than 3 cycles if the size of the calendar queue is 64K entries.

Well known scheduling algorithms can be readily implemented such as described in D. Stiliadis, "Traffic Scheduling in Packet Switched: Analysis, Design and Implementation, P.H.D. Thesis, University of California at Santa Cruz, 1996, hereby incorporated by reference as of fully set forth herein. The scheduler 109 must determine whether the packet record corresponds to an options packet or not, and whether it is a multicast packet that must be forwarded to two or more physical interfaces. It must also extract all the necessary parameters and store some of these parameters together with the packet record descriptor. The parameters that must be extracted out of the packet record include but are not limited depending on the implementation to: Control Flags, TTL, Super Class (SC), Class (C), Flow Queue Index (i), Packet Length (L), Max Queue Size (MQ), Bandwidth (g), MAC Address/Multicast Bitmap and Page List.

The scheduler must first determine whether the arriving packet is multicast or not, to which physical interface it is going and whether it is an options packet. A special queue will be dedicated to packets that have options since the main bottleneck for this queue is CPU processing. Two algorithms can be implemented: one that is executed on packet arrival and one that is executed on packet departure. When a packet record arrives in the scheduler, the corresponding flag in the multicast bitmap is checked to determine whether the packet is multicast. If the packet is a multicast packet a check is made as to whether it should be forwarded to one or more physical interfaces. One copy of the packet record is kept for each physical interface. However, the packet needs to be inserted in two different linked lists. If the packet record must be forwarded to several virtual interfaces, then when it is selected for transmission it will be forwarded to the Interface Processor multiple times.

The algorithm executed on arriving packet records is set forth and represented as pseudocode in FIG. 9(a) and the algorithm executed on departing packet records is set forth in FIG. 9(b).

Buffer Manager

The Buffer Manager 125 stores and retrieves the actual packets from the packet memory 127 which is organized in fixed sized pages—nominally of 64 bytes each. However, in the preferred embodiment, each page size is variable and user programmable. The Link List Manager 135 provides the page addresses for the storage and retrieval of data to/from the Interface Processors, and maintains the pages of a packet as a linked list as will be described. The Buffer Manager 125 has various counters for tracking different buffer occupancy counts for statistical purposes. In addition, the BM also implements the packet memory (SDRAM) controller (not shown).

In the preferred embodiment, when the Interface Processor wants to receive data, it notifies the BM with the address of the data using an address strobe signal (not shown). The BM latches the address and presents the data to the Interface Processor after a number of cycles. When the data is available, the Buffer Manager will assert a notification signal.

At the Interface Processor ingress operation, the BM notifies an Interface Processor that packets can be forwarded through a handshaking READY signal (not shown). The BM can buffer temporarily at least one page of data from each of the Interface Processors and process the corresponding requests based on a weighted round robin schedule. The implementation of the weighted robin is as follows: A round of slots, e.g., 16 slots, is provided with specific slots allocated to each Interface Processor. In accordance with the round robin schedule, if an Interface Processor does not have a request, the first Interface Processor that has a request based on the schedule must be selected. The same mechanism can be used in the egress as well. The weighted round robin schedule allows to accommodate Interface Processors with different bandwidth requirements. The BM processes the packets using a weighted round robin schedule, making it possible to accommodate Interface Processors with different bandwidth requirements.

Error Packets

For any packet for which an error is determined, a corresponding error flag is raised in the packet record. Once the packet reaches the Scheduler, steps are taken to drop this packet. A message is also sent to the CPU to perform any necessary actions. For example, an ICMP message may need to be created. As mentioned, during all these operations, the actual packets themselves are stored in the packet memory and the only indication of the existence of the packet is through the packet record. A packet exists in the system as long as the corresponding packet record exists. If the packet is dropped, the buffer manager must be notified to attach the pages occupied by the packet to the free list of pages.

Link List Manager

The Link List Manager 135 is responsible for maintaining the data structures needed to track successive pages of a packet in the memory and for keeping track of the free memory. Specifically, as shown in FIG. 10, the LLM keeps all of the packet pages linked in a free list, such that each page contains a pointer 361 pointing to the next free page of the list. When a packet has to be written into the packet memory 127 of the BM 125, the LLM provides the Interface Processor with addresses of free pages. Once the first page of the packet is stored in the BM, it links subsequent pages so that the packet is stored as a linked list of pages. When a packet needs to be read out, the Interface Processor asks the LLM for the addresses of the pages following that of the head of the packet, and then the contents of these pages are read out from the BM. Thus, the LLM allows for storage in the packet record of only a pointer to the first page of a packet and not the pointers to all pages of the packet.

There are various handshaking techniques that can be implemented for communicating address and buffer occupancy information between the Interface Processor and LLM and between the Interface Processor and the BM. Particularly, the LLM device supports the following operations:

1. FreePage=GetFreePage (Previous). The Interface Processor requests a free page from the LLM. If the Previous page is NULL, then this is the first page associated with a packet. If the Previous page is not NULL, then the new page must be linked as the next page associated with that packet;

2. FreePage=GetLastPage(Previous, Head). This operation is the same as the GetFreePage with the only difference being that the LLM should store the head together with the pointer pages.

3. NextPage=ReadPage(Address). The LLM returns a pointer to the next page associated with the packet. The page is not deleted yet; and, 4. DeletePacket(Head,pktsize).

When the LLM 135 sends a LLMDELETE command to an Interface Processor, it instructs the Interface Processor to delete packets. The command is forwarded to the scheduler and the scheduler is responsible for actually discarding a packet or packets from a flow (or flows) to free up the required number of pages. An example packet discard algorithm executed in the LLM is shown in FIG. 12(b). Particularly, the packet memory must always have available space for storing one packet from each of the PHYs.

For the case of multicast packets, i.e. packets that must be transmitted to multiple physical interfaces, only one copy of the packet is stored in the buffer manager and thus only one linked list is formed in the LLM. However, after the packet record is processed, and before it is forwarded to multiple Interface Processors or Physical Interfaces, it is transmitted to the LLM. The LLM reads the number of times that the packet will be forwarded to the physical interfaces and associates this number with a field in the corresponding linked list of the packet that is indicated as reference count. When a packet has to be deleted from the memory, the reference count associated with the packet is first decreased. If the reference count becomes 0, then it deletes the packet associated with the page Address, otherwise it stops. A non-zero reference count indicates that it is a multicast packet for which all the copies have not yet been sent out. Note that in one embodiment, multicast packets are never dropped once they are stored in the buffers. A maximum buffer size is allocated to multicast packets and packets are not admitted once this threshold is passed. Once the packet is deleted, the Buffer Counter (not shown) associated with that Interface Processor is decremented appropriately.

The LLM 135 further distributes packet records arriving from the Flow Identification Engine back to the Interface Processors. The method of distributing packet records to the Interface Processors is different for multicast and unicast packets as exemplified by the algorithm illustratively shown in FIG. 11. As indicated in the algorithm of FIG. 11, for unicast packets, the InterfaceIndex field 221 of the packet record 201 (FIG. 6(a)) is used to determine the Interface Processors to which the packet must be forwarded. If the packet is a multicast packet, the LLM 135 uses the Multicast Bitmap field 246 in the packet record 201 to multicast the packet to multiple Interface Processors. In addition, the LLM detects the number of interfaces that the multicast packet is forwarded to and updates the reference count associated with that packet. All the necessary information is available in the packet record. An example embodiment of the buffer control (sizing) algorithm is shown in FIG. 13 which is executed to bound the maximum buffer occupancy and implements thresholding with pushout.

As shown in FIG. 4, the LLM 135 has a distinct point to point interface bus 113 with each one of the Interface Processors. Each time a packet is forwarded to the Interface Processor, the size of the packet must be added to the buffer counter associated with that Interface Processor. If the packet is a multicast packet, then the size of the packet is simply added to one counter called the MCOUNTER (not shown). Each time a packet is deleted from the LLM, the corresponding Interface Processor counter is decremented.

It should be understood from the foregoing that the LLM 135 is the only device that has a central view of the system. In order to facilitate efficient buffer sharing among the interfaces, a scheme is implemented with static thresholds and push-out. Specifically, a buffer space is allocated to each Interface Processor. FIGS. 12(a) and 12(b) illustrates an example algorithm for tracking the amount of buffer space occupied by each of the Interface Processors on packet arrival and deletion, respectively. Particularly, as shown in FIG. 12(a), each time a packet record is forwarded from the LLM to an Interface Processor, a counter "BufferCounter" associated with this Interface Processor is incremented indicating increased BM allocation for that processor. When a page is transmitted from an Interface Processor the corresponding counter is decremented. The LLM 135 uses the PacketLength field 229 of the packet record 201 (FIG. 6(a)) that is passed from the Flow Identification Engine to the Interface Processor to calculate how many pages the packet will occupy. The buffer management algorithm allows the Interface Processors to exceed their threshold. However, when a global threshold is exceeded, the LLM notifies one of the Interface Processors to drop a packet by a suitable control signal (LLMDROP) and the scheduler drops packets as was described earlier. When the Interface Processor finally selects a packet to delete and deletes the packet, it notifies the LLM and the buffer counters are updated. An example algorithm for keeping track of the buffer allocation for a Interface Processor on a packet deletion is shown in FIG. 12(b).

The LLM associates pointers with pages to efficiently utilize the memory space provided in the SRAMs 127 which are usually available with a byte-wide data path. Assuming that a maximum of 32 Mbytes of memory may be installed in an SRI board, a 19-bit number for addressing all the pages, if a page size is 64 bytes, is required. In one embodiment, 24 bit words are used in order to store these pointers with an extra byte to associate a reference count with the packet. This is only required for the first page of the packet. In this way, if a packet is longer than 4 pages direct reference to the tail of the packet is available and deletion of the whole packet is easily accomplished. If, on the other hand, the packet is less than 4 pages long, then deletion of the pages can be completed sequentially without significant overhead.

The CPU must have access to the memory of the Link List Manager to perform a slow speed garbage collection function. The CPU must be able to write a block of memory, either continuous or fragmented and read a block of memory. The interface for reading or writing from the CPU is described in greater detail herein.

Filter Engine

As mentioned above, the packet record arrives at the Filter Engine block 115 from each Interface Processor 107 via line 108c. The filters are represented by an array of sorted elements with the filter performing a binary search in the array to specify if there is a match. One implementation of the filter engine is described in co-pending U.S. patent application T. V. Lakshman, D. Stiliadis, "Packet Filter Method and Apparatus for Routers, Ser. No. 08/899,423 filed on Jul. 23, 1997, commonly assigned as the instant invention, the contents and disclosure of which are incorporated by reference as if fully set forth herein. The actions associated with the match must be performed by updating the corresponding fields in the packet record. For example, fields may be updated to specify actions such as, dropping the packet, or assigning a specific quality of service to the packet.

The Filter Engine 115 can use specifications from the network manager or Resource Reservation Protocol (RSVP) to decide the classification of packets. If a packet comes from an unauthorized source, the filter engine 115 drops it. The filter engine 115 can determine if a packet belongs to a flow that must not be assigned a separate queue, e.g., Mail packets or File Transfer Protocol packets may not be assigned to a specific queue. If a Resource Reservation Protocol (RSVP) reservation has been made for a packet, the filter engine 115 can assign it a class and bandwidth. Only RSVP reservations that specify ranges of address are specified through a filter. When the packet record is input to the Flow Identification Engine 130 from the Filter Engine, it is assigned to a separate queue and forwarded to the Scheduler 109, which supports a two level scheduling mechanism—based on classes and based on queues. The filter engine 115 could also assign a packet with a specific class and not allow the Flow Identification Engine 130 to assign the packet to a queue. Instead all packets that go through this filter will go to the same queue. As some packets may have no Filter assignments, the packet will be classified in the Flow Identification Engine 130, if one of the previous actions specifies that the packet should be classified. The packet record is then sent to the Route Table Lookup Engine 120 from the filter engine 115

In the pipelined architecture of the router, it should be understood that at the time the packet record is processed by the filter engine 115, a new packet record is being generated in the Interface Processor.

Route Table Lookup Engine

As shown in FIG. 5, the Route Table Lookup Engine 120 receives packets from the Filter Engine 115 and provides the next hop information, i.e., router output port, based on the destination address, or in some cases, based on both the source and destination addresses. The operations performed on the packet record by the Route Table Lookup engine 120 include modifying the PHY index 219, InterfaceProcessor index 221, control flags 236, strict source option offset 241 and loose source option offset 243 (See FIG. 6(a)). An additional update to the packet record is the MAC address/Multicast Bitmap+flow bits 246.

The Route Table Lookup engine 120 contains the full routing table 350 enabling full routing table lookup. One implementation of the route look-up engine is described in co-pending U.S. patent application H. Tzeng, ""An Improved IP Method for Routing Table Lookup" Ser. No. 09/003,767 on Jan. 7, 1998, assigned to the same assignee as the instant invention, the contents and disclosure of which are incorporated by reference as if fully set forth herein. In order to accelerate the lookup process, the Route Table Lookup engine 120 performs the lookup in two steps. The high order bits of the address are first decoded with a direct table lookup. It should be understood that the 16 most significant bits of the address can be used to access a lookup table, however, this number can be lower in order to reduce memory requirements. As shown in FIG. 14, the table lookup will yield a pointer 351 to the root of a radix tree 355. A maximal matching algorithm such as described in H. Tzeng, ""An Improved IP Method for Routing Table Lookup" Ser. No. 09/003,767 on Jan. 7, 1998, hereby incorporated by reference as if fully set forth herein, is then implemented in order to search the tree 355 and find the route table entry with the longest prefix that matches the incoming IP address.

For purposes of explanation, it is assumed that a maximum of 128K addresses can be stored in the table. Additionally, it is assumed that a separate table is kept for IPv4, IPv6 and IPX. As will be described, some special data structures are additionally required for supporting multicast.

In one embodiment, the Route Table Lookup Engine 120 has two separate and individually addressable memories. The reason for this is that Type-of-Service based routing or load balancing may require some additional processing. Once a match is found, the Type-of-Service field is used to reference the Next Hop Information Table 360. For each address in the route table 350, there may be four entries in the Next Hop each associated with a different the type of service.

As described herein, if the packet is a multicast packet, two lookups must be performed: first, a lookup based on the source address will associate the multicast packet with a range of groups that this source address belongs to and, then, a search must be done on this range of trees, in order to define the virtual interface that the multicast packet is destined to.

After obtaining the next hop information, the Route Table Lookup engine 120 sends the packet record to the Flow Identification Engine 130. Before forwarding the packet to the Flow Identification Engine, a set of error checking and sanity operations must be performed in a sequence as exemplified in the pseudocode algorithm illustrated in FIGS. 15(*a*) and 15(*b*).

Flow Identification Engine

As shown in FIG. 4, the Flow Identification Engine 130 receives packet records from the Route Table Lookup Engine 120 as well as from the Interface Processor connected to the Switch Fabric Interface 155, and is responsible for assigning packets to specific flows. Thus, in view FIGS. 6(*a*) and 6(*b*), a specific Queue and QoS parameters will be assigned to the packet record. The basic operations are outlined as follows:

If the packet record has a Classify 303 control flag on (See FIG. 6(*b*)), this indicates that a filter specification has classified the packet as belonging to a flow that must have separate queue. The network manager, by using specific filters in the Filter Engine 115, may decide not to classify some packets belonging to certain protocols or subnetworks, in which case the Classify flag 303 will be off.

Figure 17A:
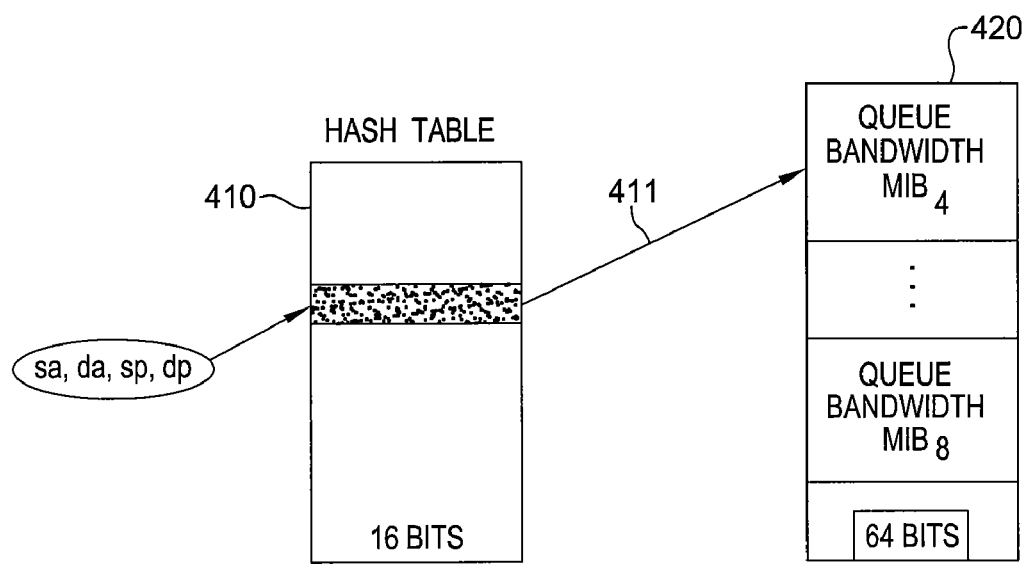
FIGS. 17(a) and 17(b) illustrate the hash table operation executed in the Flow-Identification engine.
Figure 17B:
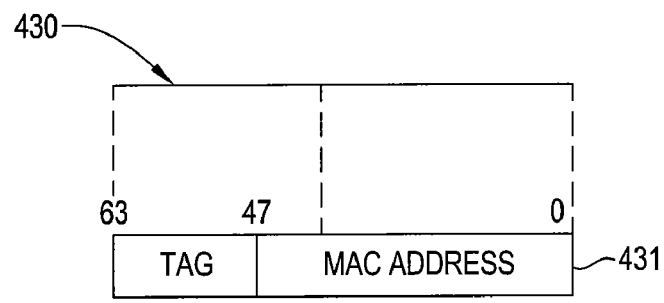

The SRI 105 can support at least 64K flows. The Flow Identification Engine 130 uses five fields, the source address 203, destination address 206, source port 209, destination port 211 and protocol 213 (FIG. 6(*a*)) as an index for dynamically identifying the flow to which a packet should belong. The search is done with the use of a hash table 410 as shown in FIG. 17(*a*). In one embodiment, the maximum size of the hash table is set to 2 million entries. The operation of the hash table will now be described herein in greater detail with reference to FIG. 17(*a*).

As shown in FIG. 17(*a*), the basic data structures consist of two tables: a hash table 410 residing in memory (not shown) that contains a pointer 411 to the flow record that a packet will be associated with; and, a table consisting of an array of records 420 that identify the queue that the flow is mapped to, and contain all information with that queue, such as the bandwidth that should be assigned to the queue and the proprietary MIB information. The two tables are stored in separate memory banks with independent address and control signals to allow pipelining of the operations.

The basic operations can be outlined as follows:

The information in the packet record 201 is used to index the hash table 410 by applying a hash function as known in the art, e.g., division by prime number. For each entry in the hash table 410 a corresponding flow record 420 is identified. The flow record is loaded and the five fields are compared with the corresponding fields contained in the packet record. If there is no match, i.e., if all available queues have been assigned to flows already, a replacement algorithm, an example of which is illustrated in FIG. 16, is executed to select a queue for replacement such that the information in the new packet record can replace the old information. If the hash table 410 is not pointing to any flow record, then a random flow record is selected and the same procedure as above is followed.

The QoS parameters for a new flow are defined in table addressable by port numbers and protocol type, e.g., TCP, UDP flows. In one implementation, the source port is used to access the corresponding table entries and determine the QoS parameters. If the source port is not known, the destination port is used in the same way.

A part of the RAM associated with the hash table is also used for resolving ARP requests and, as shown in FIG. 17(*b*), a table 430 containing, e.g., at least 64K entries, with the MAC addresses of the ARP cache with each record 431 in the table consisting of a tag and the corresponding MAC address. The same approach as in the case of the flow identification will be used to hash ARP locations and finding the corresponding physical addresses. As in the case of flow identification, a random record can be selected if the pointer does not point to a record in the MACaddress table 430.

Additionally, the Flow Identification Engine 130 keep several counters such as FLowInNumbers, flowInMisses, flowInBytes, and flowInStayAverage that are required for observing the operating of the router and detecting possible problems in the network. All counters must be accessible by the CPU as well.

From the Flow Identification Engine 130, the packet record goes to the LLM 135 and then to the outgoing Interface Processor(s), as described above. If, after the Route table lookup it is determined that the port that the packet record is destined to is located at another SRI (FIG. 2), then, the whole packet is picked up, and transmitted through the switch fabric 106 to that other SRI, where it is received, the payload stored in the buffer manager, and the packet record passed to the Flow Identification engine of that SRI to determine which queue the packet is to be transmitted.

It should be understood that the router, and particularly, the splitting of the received packet into a separately processable packet record and payload, enables the incorporation of other processors to perform additional functions in the pipeline of packet record processing modules as described. For instance, the router can be equipped with devices performing added functions such as encrypting devices, devices for concatenating two or more packets or encapsulating packets, and devices, e.g., counters, containing desirable statistics about the packet record, etc. Furthermore, enhanced scalability is achieved by virtue of the pipelined manner in which packets are processed. For instance, while one packet is being processed by the filter engine, for instance, a second packet is being processed by a different function, e.g., the route table lookup. For example, throughput is tremendously increased when two filter engines may be provided in the pipeline so that separate filtering of two packets may occur at the same time.

Multicast Support

To support efficient multicast and QoS for the multicast queues the number of multicast groups that can be active at the router at the same time is limited. When a new multicast group becomes active, this information is received from the Internet Group Multicast Protocol (IGMP). The multicast group will be assigned to a unique multicast ID. The flow of operations for a multicast packet is now described as follows:

First, a packet arrives in the ingress Interface Processor and the corresponding packet record is forwarded in the pipeline. Then, a lookup based on the source address and multicast group is performed by the Route Look-up processor as this is described by the requirements of multicast protocols PIM, PIM-DM etc. This look-up determines the SRIs that the packet must be forwarded as an SRIbitmap, and a MulticastID. When the packet arrives in another SRI, the MulticastID field will be used to determine the physical interfaces that the packet must be forwarded to.

Then, the packet record is forwarded to the flow identification module (FI). The FI detects that the packet is a multicast packet and it must determine the local virtual interfaces that the packet should be forwarded to. A flow identification is performed where the multicast packet is associated with a queue. Notice that a packet that arrives from the switch will go through the MID translation and FID as the packets that arrive from the Interface Processors.

Next, the packet record is send to the LLM and subsequently forwarded to all Interface Processors that should receive the packet. The distribution is performed in the LLM device. Once the packet arrives in the scheduler, it must be copied to multiple queues, one for each physical interface. Before the LLM forwards the packet it updates the reference count associated with that packet.

When a packet is transmitted, and depending on whether it leaves a Virtual or a Physical interface, it will be tunneled or its MAC will be determined. The MAC address for the Ethernet interfaces is simply determined from the multicast group address. For other interfaces, the MAC address if needed can be determined by the multicastID field through an a access to a table. Control software will have updated this table with all the correct values. For implementation simplicity, a special buffer management scheme is used in the case of multicast packets. Once a multicast packet is stored in the memory, it may be destined to multiple Interface Processors. As it is very expensive to find in which Interface Processors this packet is stored and to erase this packet from all the Interface Processors as well as the buffer memory, a maximum space that all multicast packets may take from the buffers is allocated. If a multicast packet arrives and this threshold is exceeded the packet is dropped. That is, for multicast packets a drop from tail strategy is implemented.

Software Architecture

Figure 18:
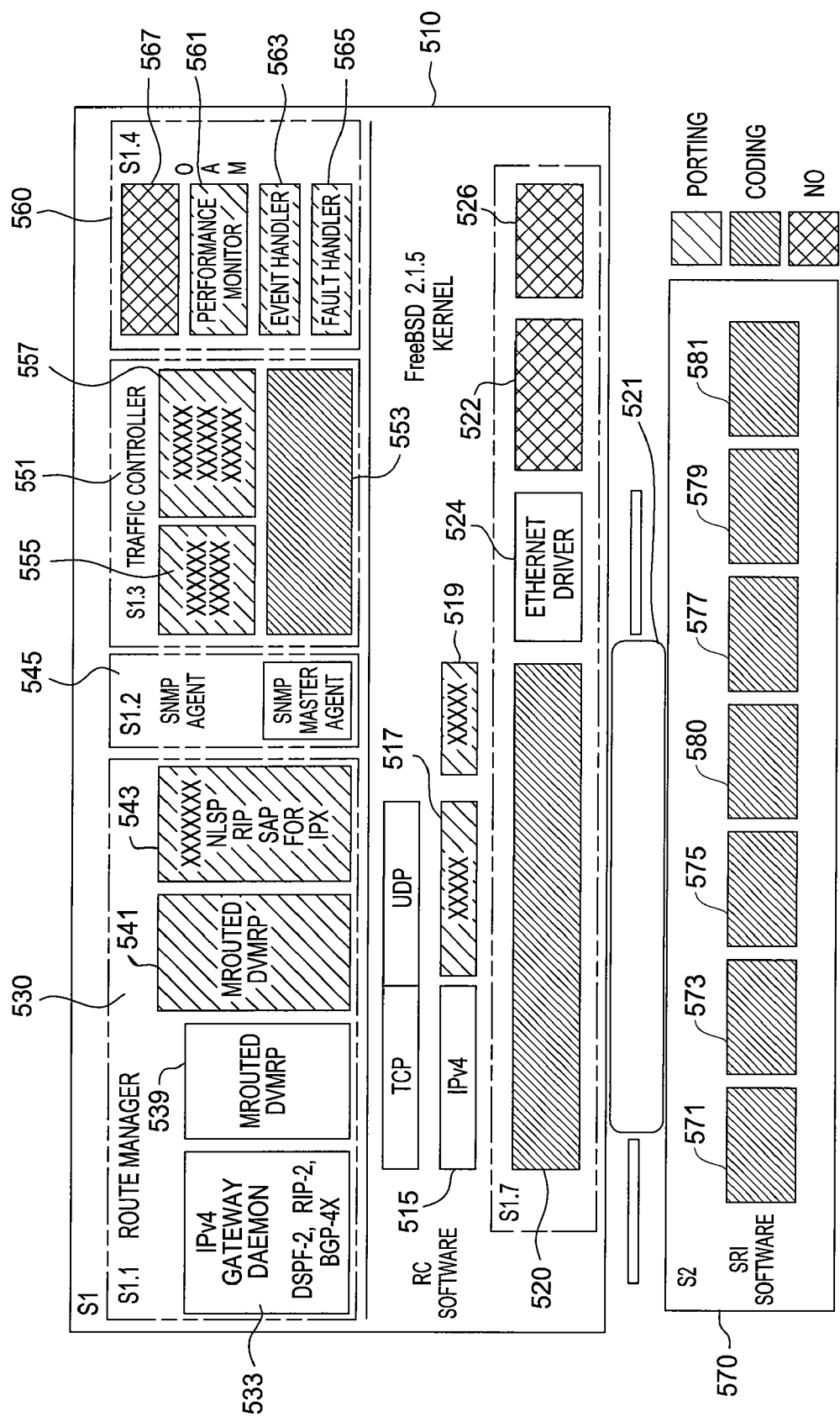
FIG. 18 illustrates the software architecture for the scalable Router.

As shown in FIG. 18, the Software Architecture of the router 100 of the invention is described in accordance with three aspects: 1) Software for the Router Controller 205; 2) Software for the Smart Router Interface 105; and, 3) Network Management System software. Each of these aspects will be discussed in greater detail as follows.

Router Controller

The Router Controller module 205 runs software to compute routes based on a number of routing protocols which routes are periodically downloaded into the Route Lookup Table Engine 120 on the SRI and is also responsible for operation, administration and maintenance functionalities. The Router Controller 205 is a single-board computer running a light-weight real-time operating system and contains software for supporting multiple routing protocols for IPv4, IPv6, and IPX, managing flows to provide QoS guarantees, providing operation, administration and maintenance functionalities and interface with the SRI through the Mailbox Communication Interface.

Particularly, the Router Controller 205 can be implemented by a single-board computer (SBC) including features such as: a Pentium 200 MHz processor, 128 Mbytes DRAM, 8-32 Mbytes of Flash memory, 10/100 Mbps Ethernet port, a serial port, boot ROM and 2 Compact PCI buses. As shown in FIG. 18, the kernel 510 of the router control software is based on a light weight real-time operating system implementing: a standard IPv4 protocol stack 515, e.g., a standard TCP/IP stack, a IPv6 protocol stack 517; a standard Novell IPX stack 519; a Data Link Interface 520 providing a standard interface between IPv4, IPv6, and IPX stacks and the mailbox communication Interface 521; and, a serial Interface 522 providing a direct access to the router. A terminal can be connected to the router directly to perform console access and system diagnosis; an Ethernet Driver 524 providing a high speed access to the router via a trusted connection; and, an LED Driver 526 that controls the display of LEDs of the RC, indicating the system status.

Route Manager

As shown in FIG. 18, the route manager 530 is a modular program provided to support multiple routing protocols and protocol families by communicating with other routers via various routing protocols to configure the routing tables residing in SRI. The route manager supports all standard routing protocols for IPv4, IPv6, and IPX. The following IP routing protocols are supported:

1) the IPv4 Interior Gateway Routing Protocols (IGP) 533 including:

RIP 535 (Routing Information Protocol) is a distance vector protocol. RIP selects the route with the lowest metric. The metric is the hop count representing the number of gateways through which data must pass to reach its destination;

RIP II Extensions to RIP protocol: IGP/EGP interactions, subnetting, and authentication.

OSPF 537: Open Shortest Path First (OSPF) which is a link state protocol. The OSPF is designed to be run internal to a single autonomous system with each OSPF router maintaining an identical database describing the autonomous system's topology. From this database, a routing table is calculated by constructing a shortest path tree.

IS-IS: Intermediate System to Intermediate System (IS-IS) is a link state IGP developed for routing ISO/CLNP (International Standard Organization/Connectionless Network Protocol) packets.

2) IPv4 Exterior Gateway Routing Protocols such as:

EGP: Exterior Gateway Protocol (EGP), which is used to exchange net reachability information between Internet gateways belonging to the same or different autonomous systems. BGP: Border Gateway Protocol (BGP) is an inter-autonomous system routing protocol. BGP handles paths between autonomous systems. These paths are described by a set of attributes like traversed autonomous systems, reachable networks etc.

BGP-4: Extension of BGP for supporting subnetting and supernetting.

3) IPv4 Multicast Routing Protocols including:

DVMRP 539: Distance Vector Multicast Routing Protocol (DVMRP) which is a simple distance vector protocol, using reverse path forwarding, path pruning, and tunneling to implement a multicast interface.

MOSPF: Multicast Open Shortest Path First (MOSPF) which is an multicast extension to OSPF. Uses the existing OSPF link state records to perform reverse path forwarding and prune computations to implement a multicast interface; and, PIM: Protocol Independent Multicast (PIM).

4) IPv6 Routing Protocols 541 including RIP for IPv6 and OSPF for IPv6; and

5) IPX Routing Protocols 543 including:

Netware RIP: Netware RIP is a simple distance vector protocol which uses the number of ticks and hops to determine the best routes. The number of ticks is the delay introduced by a network segment. It is also used to resolve the MAC addresses of link layers.

Service Advertising Protocol (SAP): allowing File Servers, Print Servers, Gateway Servers, etc., to advertise their services and addresses. Routers uses SAP to maintain a database of internetwork service information. This allows the clients on the network to determine what services are available on the network and obtain the internetwork address of the nodes (servers) where they can access the services.

Netware Link Services Protocol (NLSP): which is a Link State protocol adopted from the ISO's IS-IS protocol. This protocol overcomes the problems of distance vector protocols and addresses the demands of larger internetworks. This protocol is similar to OSPF of the IP world.

As shown in FIG. 18, the system is also provided with an SNMP (Simple Network Management Protocol) Agent 545 for supporting SNMPv2 network management access to the router. This agent supports Internet standard Management Information Base (MIB-2) including Remote Monitoring (RMON) MIB. Additional proprietary MIB modules can be defined and supported for management of the new features of the router. This will include flow management, packet filtering, and QoS guarantee.

A request-response model is employed to propagate the SNMP requests received by the SNMP agent to the processes (or SMUX peers) which exported the MIB objects. The SMUX peer then performs the operation and returns a response. In turn, the SNMP agent propagates this response back to the Network Management System. The MIBs are distributed among various modules such as Route Manager, Flow Manager, and MIB processes.

Flow Manager

As shown in FIG. 18, the Flow Manager module 551 sets up the packet filters in SRI to provide different scheduling preferences for various type of IP packets. RSVP agent as well as MBONE traffic monitor determine the QoS parameters for each class of IP traffic, which is transformed into filter specifications. The "Filter and QoS selection" module 553 performs the updates of filter engine inside the SRI.

The RSVP Agent module 555 processes RSVP and admission control functions for IP traffic and additionally determines whether to reclaim resources in the absence of refresh messages. RSVP is designed to operate with both unicast and multicast routing-protocols.

The MBONE Traffic Monitor 557 is provided to identify MBONE audio and video. By updating the filter specifications, higher preferences can be assigned to MBONE audio and video traffic. The MBONE suite of software consists of application programs, e.g., vat (Visual Audio Tool), vic (Video Conference) and whiteboard, and session directory (sdr). To start an MBONE application, e.g., vat, users select and advertise an IP multicast address and an arbitrary port number to create an audio session X, e.g., with vat. Other users obtain both the IP address and the port number of the session X to receive audio from the session X. Users employ sdr to create or search multicast sessions. sdr will listen to a well known IP multicast address and port number to obtain the sessions announcements with each announcement containing the type of MBONE applications (e.g., vat or vic), IP multicast address, port number, and a brief verbal description of the conference. The audio or video flows of MBONE traffic can be identified by intercepting packets generated by sdr to configure the router accordingly.

The Filter and QoS selection module 553 is responsible for generating filter specifications which comprise any combination of IP source/destination addresses, protocol id, and source/destination port numbers. The above IP source and destination addresses can also be combined with subnet masks to identify a range of IP addresses. For each filter specification, there is an associated QoS assignment, which identifies how the packets matched this filter are scheduled by the SRI.

Operation, Administration, and Maintenance Module

The OAM Module 560 handles performance monitoring, keeps track the history of the whole system, and allows the management system to support maintenance.

The Performance Monitor module 561 collects and reports the load of the router and the statistics of the system activities. All information collected by this module is defined by either standard or proprietary MIBS. A user can issue requests to specify the parameters to be monitored and the frequency of collection. A user can also specify the starting and stopping of collections. A set of control MIBs is defined to specify the interested information. Based on the control MIBs specified by the user, the Performance Monitor 561 may periodically send SNMP requests to keep track of the corresponding MIBS. A user can also specify multiple monitor instances with each instance specifying a set of MIBs of interest, e.g., Cisco Systems MIBs or ATM standard may be referred to for implementation methods.

The Event Handler module 563 keeps a history of vital events of the whole system, including information from the Fault Handler. This history can be downloaded via either ftp or a web browser. All modules report significant events to the Event Handler, which will store these events in a log file. The log file can be analyzed by an event viewer. The events that are part of the SNMP traps will be forwarded to the SNMP Master Agent in the appropriate format.

A Trace Handler module (not shown) can be implemented to allow users to initiate or stop trace in a subsystem and is useful for system debugging. This subsystem will generate trace for various situations such as packets received, route updated, etc. The trace information will be sent to the Trace Handler, which is responsible for logging this trace information.

The Fault Handler module 565 receives reports from the Fault Module 579 inside SRI 570 via a Fault and Recovery Interface. It determines whether the fault can be recovered automatically or should be processed manually. It also sends these reports to the Event Handler. The Fault handler 565 also periodically sends "heart-beat" requests to each user-mode module, including the GateD 533, the RSVP Module 555, and the SNMP Master Agent 545. Upon receiving the heart-beat request, a module sends a heart-beat reply to the Fault Handler 565. If the Fault Handler 565 does not receive the heart-beat reply after sending the request, the Fault Handler 565 will take proper actions to resolve the problems, e.g, restart the failure process, send fault events to the Event Handler 563.

The Configuration Handler 567 provides the interface between Network Management System and the RC and allows the RC to enable or disable the physical interfaces, perform diagnosis, download new SRI software, and other maintenance utilities. The Configuration Handler consists of the following subsystems:

1) Configuration Subsystem that maintains static configuration parameters. These parameters are divided into two categories: OEM supplied defaults, which cannot be changed; and Startup (power-on) defaults, which can be changed only after the next reboot of the system.

2) Operation Subsystem that can start, stop any modules of the router. It can also be used to query the status of any module, including processes, links, protocols. In particular, the following operations that are supported include: 1) Bring up and bring down links; 2) Start and stop TCP/IP, Route Manager, SNMP Master Agent, TELNETD, and FTFPD; and 3) Change Dynamic parameters, including 1.) Parameters which are part of the standard MIBs; 2.) Parameters which are part of the private MIBs; and 3.) parameters which are not part of the MIBs.

3) Software Installation and Removal Subsystem can be used to install and remove software, including SRI firmware. The following modules can be installed via this subsystem: SRI firmware module, Route Manager, RSVP Agent, and, SNMP Master Agent.

4) Diagnosis Subsystem can run specific tests of the system. For example, when there is a problem in the hardware, a set of diagnostic functions can be invoked to analyze the problem.

Router Interface Software

As shown in FIG. 18, the SRI software 570 assists the RC to manage the SRI hardware, and reports and failures. It also supports address resolution for MAC layer protocols such as Ethernet. The SRI software includes the following software modules:

An ARP Module 571 for receiving all ARP packets dispatched from the SRI hardware and for processing the ARP requests and responses, and generates ARP requests to resolve IP to MAC addresses.

A Control Module 573 for receiving all Internet Control Message Protocol "ICMP" packets, handling ICMP error messages like destination unreachable, time exceeded etc. and handling the control messages like host and network redirect. Upon receiving an ICMP redirect message, the Control Module forwards this message to the RC via the Mailbox Communication Interface.

The Flow Module 575 handles the RC's requests to add and delete flows as well as to change QoS parameters of flows.

The Fault Module 579 reports all faults and exceptions to the RC. These reports are dispatched to the Fault Handler of the RC via the Mailbox Communication Interface 521. The faults can be bus error, software hung, etc. Upon receiving the report of a fault, depending on the types of the faults, the Fault handler 565 attempts to recover from the fault, resets the card into a stable state, or ignores the faults.

The Route Module 577 handles the requests from the routing protocols to manipulate the routing table maintained in the SRI card. The routing protocols can add, delete, query, and change the routing table entries. The requests are received through the Mailbox Communication Interface 521.

The MIB Module 580 handles the SNMP requests from the SNMP agent and sends back the corresponding responses to the agent. The following counters are implemented in the SRI to support the SNMP MIBs: Filter Counters, Flow Counters, Interface Processor Counters. A flow is a quintuplet and defined by the following fields in the IPv4 headers: Protocol, Source Port, Destination Port, Source Address, Destination Address (or P, SP, DP, SA, DA).

The Configuration Module 581 provides the interface with the RC to enable or disable physical interfaces, perform diagnosis, download new SRI software and other maintenance utilities.

As shown in FIG. 18, a simple mailbox mechanism 521 is employed to provide inter-process communication between the RC and each of the SRI cards. To send a message, a process posts the message to the recipient's mailbox. To receive a mailbox message, a recipient can either poll or be interrupted to obtain its incoming mailbox messages. Preferably, the mailbox messages have two priorities: high and normal. To support the message priority, each mailbox implements two queues for incoming messages: high priority and normal priority queues. The messages in the high priority queue are served before the ones in the normal priority queues.

Both the RC and each SRI have their own mailboxes, namely RC Mailbox and SRI Mailbox. Each mailbox message is defined by a 64-byte Command Control Block (CCB).

Figure 19:
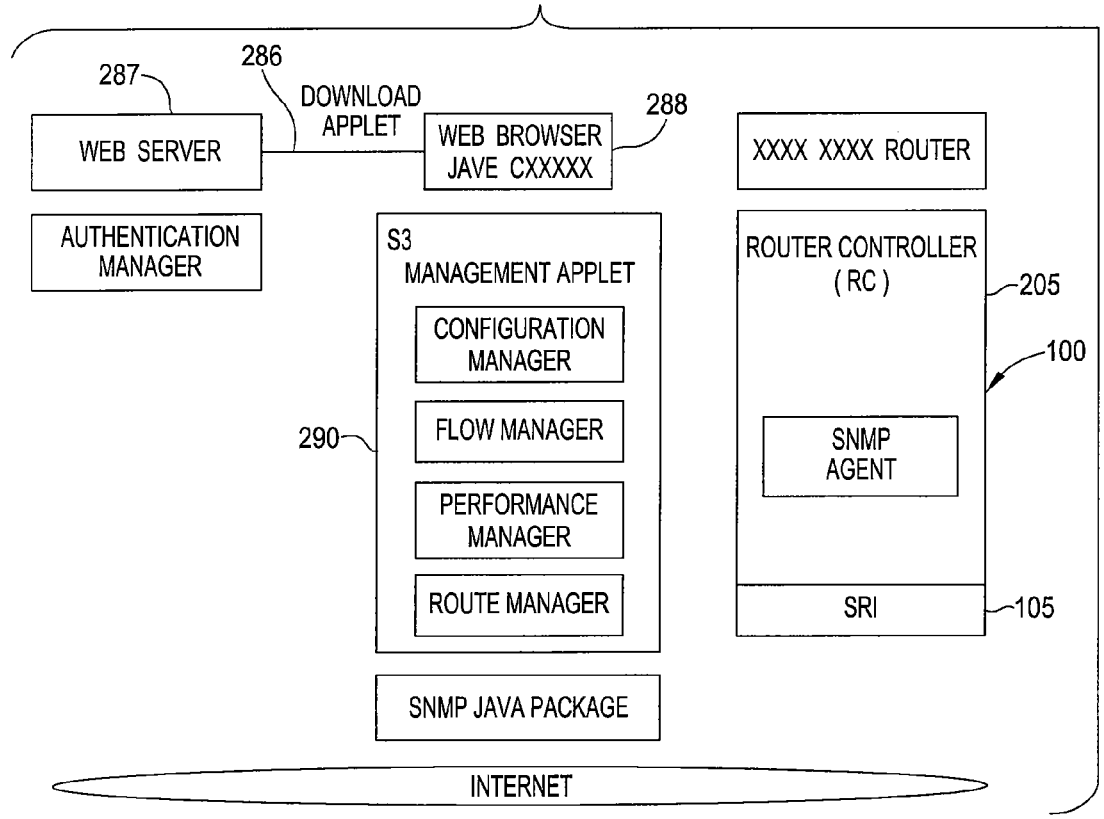
FIG. 19 illustrates the Network Management System for remote managing of the scalable Router.
Figure 20:
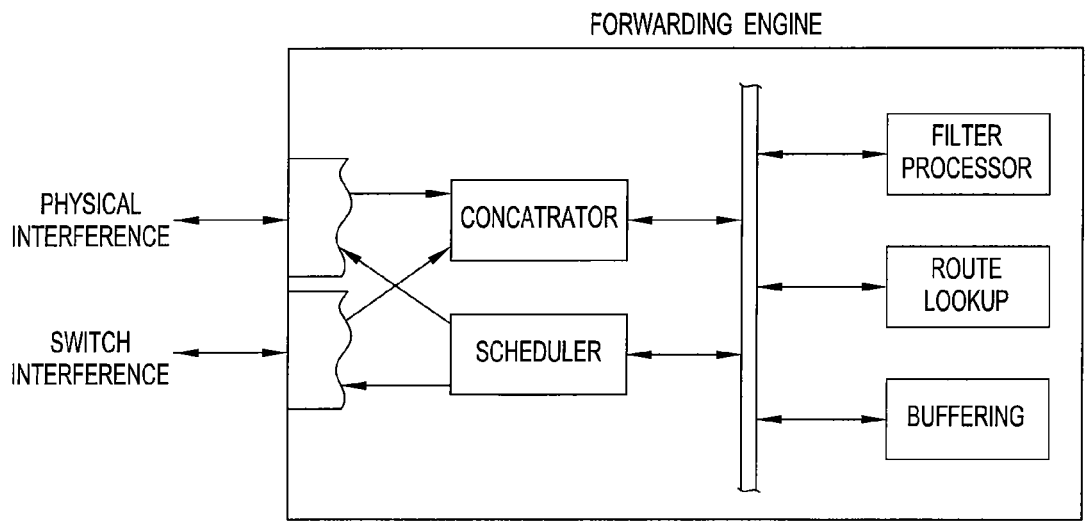
FIG. 20 illustrates an alternative embodiment of the invention.

As shown in FIG. 19, a management system 585 is provided to support standard network management functions that manage the router and that can be connected to the router via the serial or Ethernet interface of the RC or any physical interface terminated at the SRI.

In view of FIG. 19, the management application is a set of JAVA applets 586, which can be downloaded from a web server 587. After downloading the proper applets, a web browser 588 can run these applets to manage the router with a graphical user interface.

The Management Applets 590 implement a set of utilities, e.g., written in JAVA, to manage the Router 100. These applets communicate with the SMUX agent on the router, using SNMPv2. The SMUX agent distributes the queries of applets to the proper router modules, and then send back the responses. As shown in FIG. 19, the Management Applets consists of the following management entities:

1) A Configuration Manager utility used to set/get general router parameters and to upgrade new version of the software or firmware, configure the Ethernet, and serial ports on the router;

2) A Flow Manager utility used to configure the flows needed to be monitored. The flows can be defined using standard TCP/UDP ports, RSVP, MBONE Traffic monitor;

3) Performance Manager utility used to get detailed statistics about the traffic through the router. The Router SNMP agent supports Standard MIBS (includes IP, TCP, UDP, etc.), Flow MIB, SRI MIB; and, 4) Route Manager utility used to configure static route entries on the router.

The foregoing merely illustrates the principles of the present invention. Those skilled in the art will be able to devise various modifications, which although not explicitly described or shown herein, embody the principles of the invention and are thus within its spirit and scope.

What is claimed is:

1. A scalable, high-speed router for routing packets of information through an interconnected network, said router comprising:
    a) an interface means for receiving a packet including a header and data information;
    b) means for extracting routing information from said header of said arrived packet and generating a header packet for said arrived packet, wherein said header packet includes said routing information extracted from said header of said arrived packet;
    c) memory means for storing said data information of said arrived packet at predetermined memory locations;
    d) means for processing said header packet to determine a route for said arrived packet, said processing means assigning packet forwarding information to said header packet; and
    e) means for retrieving said data information from said predetermined memory locations and forwarding said data information and said header packet including said packet forwarding information to said interface means for routing said arrived packet to a further destination in accordance with said packet forwarding information.

2. A scalable, high-speed router for routing packets as claimed in claim 1, wherein said interface means includes scheduler means for forwarding said processed packet;
    wherein, if said packet forwarding information includes a quality of service requirement, said scheduler means forwards said arrived packet in accordance with said quality of service requirement;
    wherein, if said packet forwarding information includes a flow specification, said scheduler means forwards said arrived packet in accordance with said flow specification.

3. A scalable, high-speed router for routing packets as claimed in claim 2, wherein said scheduler means includes means for implementing a weighted fair-queuing scheduling scheme.

4. A scalable, high-speed router for routing packets as claimed in claim 1, wherein said routing information included in said header packet includes source and destination addresses and other routing parameters, said processing means further including filter means for determining propriety of said arrived packet to be routed based on one or more of said source addresses, destination addresses and other routing parameters.

5. A scalable, high-speed router for routing packets as claimed in claim 1, wherein said processing means further includes route look-up table means for determining a destination address to which said arrived packet is to be forwarded, wherein said destination address is determined from said header packet.

6. A scalable, high-speed router for routing packets as claimed in claim 5, wherein said processing means further includes flow identification means for receiving said arrived packet and assigning said arrived packet to a specific flow.

7. A scalable, high-speed router for routing packets as claimed in claim 6, wherein said flow identification means forwards said header packet including said packet forwarding information to said interface means for use in routing said arrived packet.

8. A scalable, high-speed router for routing packets as claimed in claim 1, wherein said memory means is a high speed buffer memory.

9. A scalable, high-speed router for routing packets as claimed in claim 1, wherein said data information of said arrived packet is stored as successive pages in said predetermined memory locations, said router further including link list manager means for tracking address locations for said successive pages containing said data information of said arrived packet.

10. A scalable, high-speed router for routing packets as claimed in claim 7, wherein said filtering means, route-table look-up means, and flow identification means are organized in a pipelined fashion that successively operate on said header packet and assign said packet forwarding information to said header packet.

11. A method for routing packets of information in an interconnected network, said method comprising the steps of:
   a) receiving a packet including a header and data information;
   b) extracting routing information from said header of said arrived packet and generating a header packet for said arrived packet, wherein said header packet includes said routing information extracted from said header of said arrived packet;
   c) storing said data information of said arrived packet at predetermined memory locations;
   d) processing said header packet to determine a route for said arrived packet and assigning packet forwarding information to said header packet; and
   e) retrieving said data information from said predetermined memory locations and forwarding said data information and said header packet including said packet forwarding information for routing said arrived packet to a further destination in accordance with said packet forwarding information.

12. A method for routing packets of information as claimed in claim 11, wherein said routing information included in said header packet includes source and destination addresses and other routing parameters, said processing step d) further including the step f) of determining the propriety of said arrived packet to be routed based on one or more of said source addresses, destination addresses and other routing parameters.

13. A method for routing packets of information as claimed in claim 12, wherein said processing step d) further includes the step g) of determining a destination address to which said arrived packet is to be forwarded, wherein said destination address is determined from said header packet.

14. A method for routing packets of information as claimed in claim 13, wherein said processing step d) further includes the step h) of assigning said arrived packet to a specific flow.

15. A method for routing packets of information as claimed in claim 14, wherein said processing steps f), g), and h) are successively performed in a pipe-lined fashion.

16. A network router comprising:
   a) an interface for receiving and transmitting packets, each packet containing comprising a header and data information;
   b) means for extracting routing information from an arrived packet and generating a packet record corresponding to the arrived packet, the packet record corresponding to the arrived packet comprising routing and processing information included in the arrived packet;
   c) memory for storing data information of the arrived packet at predetermined memory locations;
   d) a processor for processing the packet record corresponding to the arrived packet and determining a route and resource assignments for the arrived packet, the processor assigning packet forwarding information to the packet record corresponding to the arrived packet;
   e) means for retrieving the data information of the arrived packet from the predetermined memory locations and assembling an outgoing packet corresponding to the arrived packet from the data information of the arrived packet, the packet record corresponding to the arrived packet, and the packet forwarding information assigned to the packet record corresponding to the arrived packet;
   f) means for queuing and scheduling for transmission the outgoing packet corresponding to the arrived packet, the queuing and scheduling being based on quality-of-service requirements of the arrived packet; and
   g) means for forwarding the outgoing packet corresponding to the arrived packet to the interface for transmitting the outgoing packet to a further destination in accordance with the forwarding information assigned to the packet record corresponding to the arrived packet.

* * * * *